US012769761B2

(12) United States Patent
Ling et al.

(10) Patent No.: US 12,769,761 B2
(45) Date of Patent: Oct. 20, 2026

(54) NON-DISRUPTIVE INTRASITE METRO VOLUME MIGRATION

(71) Applicant: Dell Products L.P., Hopkinton, MA (US)

(72) Inventors: Qing Hua Ling, Beijing (CN); Girish Sheelvant, Hopkinton, MA (US); Mark Yue Qian, Shanghai (CN)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 19/032,847

(22) Filed: Jan. 21, 2025

(65) Prior Publication Data

US 2026/0211897 A1 Jul. 23, 2026

(51) Int. Cl.

| | |
|---|---|
| ***G06F 12/08*** | (2016.01) |
| ***G06F 12/0808*** | (2016.01) |
| ***G06F 12/0815*** | (2016.01) |
| ***G06F 16/27*** | (2019.01) |

(52) U.S. Cl.
CPC .................................. *G06F 16/275* (2019.01)

(58) Field of Classification Search
CPC ..... G06F 3/0619; G06F 3/0659; G06F 3/0683
USPC .......................................................... 711/162
See application file for complete search history.

(56) References Cited

U.S. PATENT DOCUMENTS

2024/0346045 A1* 10/2024 Sheelvant ........... G06F 11/1451

OTHER PUBLICATIONS

U.S. Appl. No. 18/401,916, filed Jan. 2, 2024, "Tracking Writes and Snapshot Creation/Deletion in Memory to Improve Asynchronous Replication Performance and Support Lower Recovery Point Objectives (RPOS)".
U.S. Appl. No. 18/361,399, filed Jul. 28, 2023, "Managing Transient Snapshots for Reduced Metadata Writes".

* cited by examiner

*Primary Examiner* — Mohamed M Gebril
(74) *Attorney, Agent, or Firm* — BainwoodHuang

(57) ABSTRACT

Techniques can include: configuring a metro volume for bi-directional synchronous replication from a volume pair (V1A, V2), where V1A is included in a migration site and V2 is included in a non-migration site; and performing migration processing to migrate V1A to V1B of the migration site. The migration processing can include: internally assigning the migration site a non-preferred role and the non-migration site a preferred role; pausing the metro volume including fracturing the metro volume; removing access to the metro volume through the migration site having the non-preferred role whereby all I/Os directed to the metro volume from the external clients are directed to the non-migration site having the preferred role; after V1A and V1B are synchronized in terms of content, enabling the metro volume for bi-directional synchronous replication from a second volume pair (V1B, V2); providing access to the metro volume configured as the second volume pair.

20 Claims, 12 Drawing Sheets

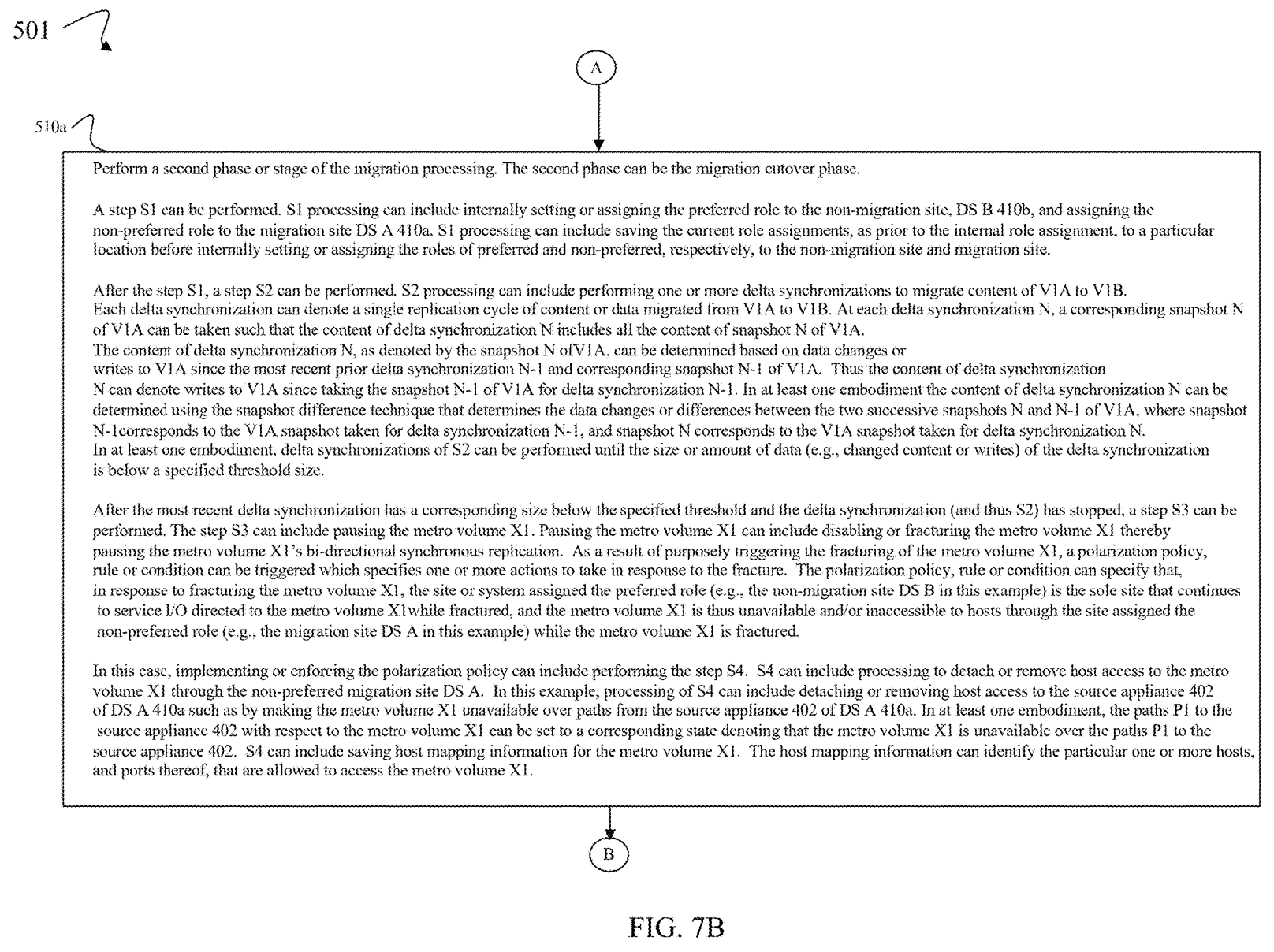

501

A

510a

Perform a second phase or stage of the migration processing. The second phase can be the migration cutover phase.

A step S1 can be performed. S1 processing can include internally setting or assigning the preferred role to the non-migration site, DS B 410b, and assigning the non-preferred role to the migration site DS A 410a. S1 processing can include saving the current role assignments, as prior to the internal role assignment, to a particular location before internally setting or assigning the roles of preferred and non-preferred, respectively, to the non-migration site and migration site.

After the step S1, a step S2 can be performed. S2 processing can include performing one or more delta synchronizations to migrate content of V1A to V1B.
Each delta synchronization can denote a single replication cycle of content or data migrated from V1A to V1B. At each delta synchronization N, a corresponding snapshot N of V1A can be taken such that the content of delta synchronization N includes all the content of snapshot N of V1A.
The content of delta synchronization N, as denoted by the snapshot N ofV1A, can be determined based on data changes or writes to V1A since the most recent prior delta synchronization N-1 and corresponding snapshot N-1 of V1A. Thus the content of delta synchronization N can denote writes to V1A since taking the snapshot N-1 of V1A for delta synchronization N-1. In at least one embodiment the content of delta synchronization N can be determined using the snapshot difference technique that determines the data changes or differences between the two successive snapshots N and N-1 of V1A, where snapshot N-1corresponds to the V1A snapshot taken for delta synchronization N-1, and snapshot N corresponds to the V1A snapshot taken for delta synchronization N.
In at least one embodiment, delta synchronizations of S2 can be performed until the size or amount of data (e.g., changed content or writes) of the delta synchronization is below a specified threshold size.

After the most recent delta synchronization has a corresponding size below the specified threshold and the delta synchronization (and thus S2) has stopped, a step S3 can be performed. The step S3 can include pausing the metro volume X1. Pausing the metro volume X1 can include disabling or fracturing the metro volume X1 thereby pausing the metro volume X1's bi-directional synchronous replication. As a result of purposely triggering the fracturing of the metro volume X1, a polarization policy, rule or condition can be triggered which specifies one or more actions to take in response to the fracture. The polarization policy, rule or condition can specify that, in response to fracturing the metro volume X1, the site or system assigned the preferred role (e.g., the non-migration site DS B in this example) is the sole site that continues to service I/O directed to the metro volume X1while fractured, and the metro volume X1 is thus unavailable and/or inaccessible to hosts through the site assigned the non-preferred role (e.g., the migration site DS A in this example) while the metro volume X1 is fractured.

In this case, implementing or enforcing the polarization policy can include performing the step S4. S4 can include processing to detach or remove host access to the metro volume X1 through the non-preferred migration site DS A. In this example, processing of S4 can include detaching or removing host access to the source appliance 402 of DS A 410a such as by making the metro volume X1 unavailable over paths from the source appliance 402 of DS A 410a. In at least one embodiment, the paths P1 to the source appliance 402 with respect to the metro volume X1 can be set to a corresponding state denoting that the metro volume X1 is unavailable over the paths P1 to the source appliance 402. S4 can include saving host mapping information for the metro volume X1. The host mapping information can identify the particular one or more hosts, and ports thereof, that are allowed to access the metro volume X1.

B

FIG. 7B

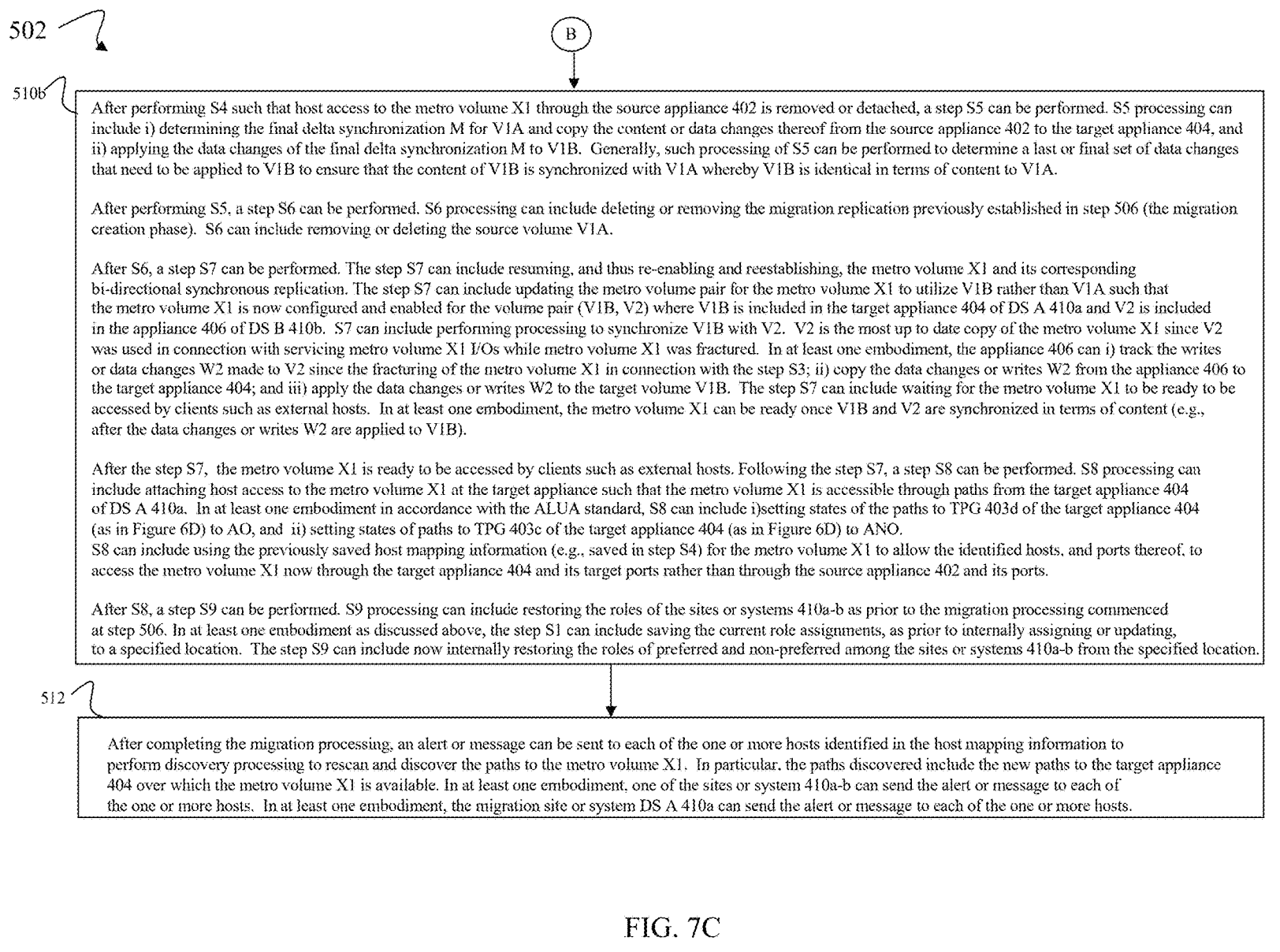

502

B

510b

After performing S4 such that host access to the metro volume X1 through the source appliance 402 is removed or detached, a step S5 can be performed. S5 processing can include i) determining the final delta synchronization M for V1A and copy the content or data changes thereof from the source appliance 402 to the target appliance 404, and ii) applying the data changes of the final delta synchronization M to V1B. Generally, such processing of S5 can be performed to determine a last or final set of data changes that need to be applied to V1B to ensure that the content of V1B is synchronized with V1A whereby V1B is identical in terms of content to V1A.

After performing S5, a step S6 can be performed. S6 processing can include deleting or removing the migration replication previously established in step 506 (the migration creation phase). S6 can include removing or deleting the source volume V1A.

After S6, a step S7 can be performed. The step S7 can include resuming, and thus re-enabling and reestablishing, the metro volume X1 and its corresponding bi-directional synchronous replication. The step S7 can include updating the metro volume pair for the metro volume X1 to utilize V1B rather than V1A such that the metro volume X1 is now configured and enabled for the volume pair (V1B, V2) where V1B is included in the target appliance 404 of DS A 410a and V2 is included in the appliance 406 of DS B 410b. S7 can include performing processing to synchronize V1B with V2. V2 is the most up to date copy of the metro volume X1 since V2 was used in connection with servicing metro volume X1 I/Os while metro volume X1 was fractured. In at least one embodiment, the appliance 406 can i) track the writes or data changes W2 made to V2 since the fracturing of the metro volume X1 in connection with the step S3; ii) copy the data changes or writes W2 from the appliance 406 to the target appliance 404; and iii) apply the data changes or writes W2 to the target volume V1B. The step S7 can include waiting for the metro volume X1 to be ready to be accessed by clients such as external hosts. In at least one embodiment, the metro volume X1 can be ready once V1B and V2 are synchronized in terms of content (e.g., after the data changes or writes W2 are applied to V1B).

After the step S7, the metro volume X1 is ready to be accessed by clients such as external hosts. Following the step S7, a step S8 can be performed. S8 processing can include attaching host access to the metro volume X1 at the target appliance such that the metro volume X1 is accessible through paths from the target appliance 404 of DS A 410a. In at least one embodiment in accordance with the ALUA standard, S8 can include i)setting states of the paths to TPG 403d of the target appliance 404 (as in Figure 6D) to AO, and ii) setting states of paths to TPG 403c of the target appliance 404 (as in Figure 6D) to ANO.
S8 can include using the previously saved host mapping information (e.g., saved in step S4) for the metro volume X1 to allow the identified hosts, and ports thereof, to access the metro volume X1 now through the target appliance 404 and its target ports rather than through the source appliance 402 and its ports.

After S8, a step S9 can be performed. S9 processing can include restoring the roles of the sites or systems 410a-b as prior to the migration processing commenced at step 506. In at least one embodiment as discussed above, the step S1 can include saving the current role assignments, as prior to internally assigning or updating, to a specified location. The step S9 can include now internally restoring the roles of preferred and non-preferred among the sites or systems 410a-b from the specified location.

512

After completing the migration processing, an alert or message can be sent to each of the one or more hosts identified in the host mapping information to perform discovery processing to rescan and discover the paths to the metro volume X1. In particular, the paths discovered include the new paths to the target appliance 404 over which the metro volume X1 is available. In at least one embodiment, one of the sites or system 410a-b can send the alert or message to each of the one or more hosts. In at least one embodiment, the migration site or system DS A 410a can send the alert or message to each of the one or more hosts.

FIG. 7C

NON-DISRUPTIVE INTRASITE METRO VOLUME MIGRATION

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise:

configuring a metro volume for bi-directional synchronous replication from a volume pair (V1A, V2), where V1A is included in a first site and V2 is included in a second site, wherein V1A and V2 are configured to have a same identity, a first identity of a first logical device, when presented to external clients over i) first paths from the first site and ii) second paths from the second site; and performing migration processing to migrate V1A to another volume V1B of the first site, wherein the first site is a migration site and wherein the second site is a non-migration site, said migration processing including: internally assigning i) the migration site a non-preferred role, and ii) the non-migration site a preferred role; pausing the metro volume including fracturing the metro volume thereby disabling the bi-directional synchronous replication with respect to the volume pair (V1A, V2), wherein V1A denotes a first point in time copy of the metro volume when the metro volume is fractured by said pausing; in response to said fracturing the metro volume, removing access to the metro volume through the migration site having the non-preferred role whereby all I/Os directed to the metro volume from the external clients are directed to the non-migration site having the preferred role; receiving, at the non-migration site while the metro volume is fractured, first writes directed to the metro volume where the first writes are applied to V2 configured as the metro volume; after V1A and V1B are synchronized in terms of content such that V1A and V1B are both identical in terms of content to the first point in time copy of the metro volume, enabling the metro volume for bi-directional synchronous replication from a second volume pair (V1B, V2), wherein V1B and V2 are configured to have the same identity, the first identity of the first logical device, when presented to external clients over i) third paths from the first site and ii) the second paths from the second site, wherein said enabling includes: synchronizing V1B and V2 in terms of content, including applying the first writes to V1B, where prior to said synchronizing, V2 denotes a more up to date copy of the metro volume that V1B; and in response to said enabling the metro volume for bi-directional synchronous replication from the second volume pair (V1B, V2), providing access to the metro volume configured as the second volume pair to the external hosts from both the migration site and the non-migration site.

In at least one embodiment, V1A can be included in a source appliance of the migration site, V1B can be included in a target appliance of the migration site, and the source appliance can be different from the target appliance. V1A, configured as the first logical device with the first identity, can be accessible to the external clients over the first paths from the source appliance of the migration site prior to said migration processing and prior to said fracturing the metro volume. V1B, configured as the first logical device with the first identity, may not be accessible to the external clients prior to said migration processing. V1B, configured as the first logical device with the first identity, may not be accessible to the external clients prior to said enabling. V2, configured as the first logical device with the first identity, can be accessible to the external clients over the second paths of the non-migration site while performing said method, and wherein V1B, configured as the first logical device with the first identity, can be accessible to the external clients over the third paths of the target appliance of the migration site after said providing access to the metro volume when configured from the second volume pair (V1B, V2).

In at least one embodiment, a polarization policy can specify that, if the metro volume is fractured thereby disabling the bi-directional synchronous replication with respect to the volume pair (V1A, V2), a selected one of the migration site and the non-migration site currently assigned the preferred role remains online as a sole site available to service I/Os directed to the metro volume while the metro volume is fractured. The polarization policy can specify that, if the metro volume is fractured thereby disabling the bi-directional synchronous replication with respect to the volume pair (V1A, V2), the metro volume is unavailable from a selected one of the migration site and the non-migration site currently assigned the non-preferred role while the metro volume is fractured.

In at least one embodiment, prior to said pausing, processing can include copying a first portion of data of V1A to V1B. Prior to said pausing and after said copying the first portion, processing can include performing one or more delta synchronizations each copying a different data portion of V1A to V1B. Processing can include receiving, at the migration site while performing said copying of the first portion of data of V1A to V1B, second writes directed to the metro volume, wherein a first of the one or more delta synchronizations can include copying the second writes from V1A to V1B.

In at least one embodiment, configuring the metro volume can include enabling bi-directional synchronous replication for the metro volume configured from the volume pair (V1A, V2). When bi-directional synchronous replication is enabled for the metro volume configured from the volume pair (V1A, V2), processing can include performing said bi-directional synchronous replication for the metro volume configured from the volume pair (V1A, V2). Performing bi-directional synchronous replication for the metro volume configured from the volume pair (V1A, V2) can include: receiving, at the first site, third writes directed to the metro volume; applying the third writes to V1A; replicating the third writes from the first site to the second site; and applying the third writes, as replicated from the first site, to V2 of the second site. Performing bi-directional synchronous replication for the metro volume configured from the volume pair (V1A, V2) can include: receiving, at the second site, fourth writes directed to the metro volume; applying the fourth writes to V2; replicating the fourth writes from the second site to the first site; and applying the fourth writes, as replicated from the second site, to V1A of the first site.

In at least one embodiment, processing can include, after V1A and V1B are synchronized in terms of content such that V1A and V1B are both identical in terms of content to the first point in time copy of the metro volume, removing V1A. Prior to said internally assigning, the migration site can be assigned the preferred role and the non-migration site can be assigned the non-preferred role. Processing can include: prior to said internally assigning, saving first information denoting a first role assignment where the migration site is assigned the preferred role and the non-migration site is assigned the non-preferred role; and after said providing access to the metro volume through the migration site whereby the metro volume is accessible to the external hosts from the migration site and the non-migration site, internally restoring role assignments, including reassigning the preferred role and the non-preferred role, respectively, to the migration site and the non-migration site based, at least in part, on the first information.

BRIEF DESCRIPTION OF THE DRAWINGS

Features and advantages of the present disclosure will become more apparent from the following detailed description of exemplary embodiments thereof taken in conjunction with the accompanying drawings in which:

FIGS. 7A, 7B and 7C present a flowchart of processing steps that can be performed in at least one embodiment in accordance with the techniques of the present disclosure.

DETAILED DESCRIPTION OF EMBODIMENT(S)

Figure 1:
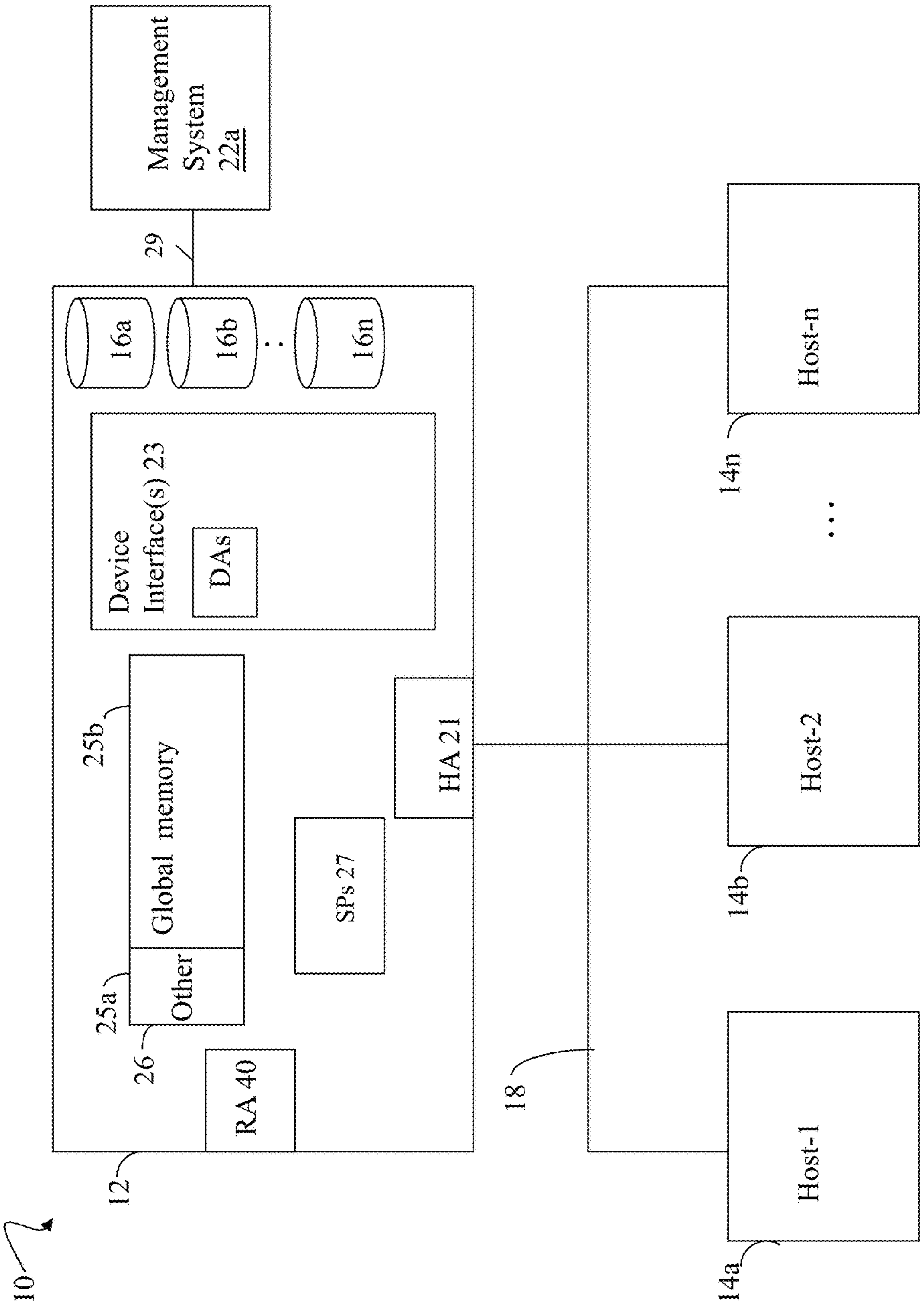
FIG. 1 is an example of components that can be included in a system in accordance with the techniques of the present disclosure.

Two data storage systems or sites such as "site or system A" and "site or system B", can present a single data storage resource or object, such as a storage volume or logical device, to a client, such as a host. The volume can be configured as a stretched volume or resource where a first volume V1 on site A and a second volume V2 on site B are both configured to have the same identity, such as the same logical volume or device identity, from the perspective of the external host. The stretched volume can be exposed over paths going to both sites A and B.

In some systems, the stretched volume can be configured for one-way replication in either an asynchronous mode or a synchronous mode. When configured for one-way replication, a host or other client can issue I/Os, including writes, to only a single one of the systems or sites A and B, but not both. In some systems, the stretched volume can be included in a metro replication configuration (sometimes simply referred to as a metro configuration) where the host can issue I/Os, including writes, to the stretched volume over paths to both site A and site B, where writes to the stretched volume on each of the sites A and B are automatically synchronously replicated to the other peer site. In this manner with the metro replication configuration, the two data storage systems or sites can be configured for two-way or bi-directional synchronous replication for the configured stretched volume. A stretched volume configured for two-way or bi-directional synchronous replication in the metro replication configuration can also sometimes be referred to as a metro volume.

In at least one embodiment, a data storage system or site can be configured as a cluster of multiple storage appliances. A volume can be migrated between appliances of the same cluster or data storage system, for example, for load balancing or other suitable purpose. In at least one embodiment, a metro volume can be configured from a volume pair V1 of site A and V2 of site B, where site A and/or site B can be a data storage system configured as a cluster of multiple storage appliances. Thus in at least one embodiment, the metro volume can be configured in a replication configuration between two clusters of two respective sites or data storage systems, where each such cluster can include one or more appliances. In at least one embodiment, each of the two clusters of the two respective storage systems can include multiple appliances.

One approach that can be used for migrating a volume, such as volume A, of system A between storage appliances of the same cluster of system A, where the volume A is configured in a volume pair of a metro volume, can include i) ending and disabling the metro volume configuration and associated replication; ii) once the metro volume configuration and replication are ended or disabled, the standalone volume A can be migrated within the site or system A cluster from a source to a target storage appliance of the cluster of system A; and iii) once volume A migration between storage appliances of system A is complete, the corresponding metro volume and replication can be reconfigured and enabled whereby the two way synchronous replication of the metro volume can resume.

The foregoing approach can have associated drawbacks. One drawback can be related to a maximum number of target port groups supported for a metro volume across both sites or systems A and B. In at least one embodiment, a maximum number of 4 target port groups can be allowed to be configured for the metro volume, and thus collectively for V1 and V2 configured as the metro volume, across systems A and B. A host or external client can be configured to access V1 through 2 target port groups of system A and 2 additional target port groups of system B so that the 4 target port group limit is met. Some intra-cluster migration approaches, such as for migrating V1 from a source to a target appliance in cluster A of system A, can include extending host access to the target appliance over yet 2 more target port groups of system A during the migration thereby having the metro volume configured for access over 6 target port groups during the intra-cluster migration of volume A. Put another way, extending host access during the intra-cluster migration of volume A from the source to the target appliance of system A can include further configuring volume A to be accessible over yet an additional 2 target port groups of the target appliance while also maintaining i) the existing access of volume A over 2 target port groups of the source appliance, and ii) the existing access of volume B over 2 target port groups of an appliance of system B. Thus, extending host access during the intra-cluster migration of volume A on system A can utilize a total of 6 target port groups thereby exceeding the allowed maximum of 4 target port groups.

Yet another drawback of the foregoing approach is that only one mirror can be supported for a volume. In this manner, each of V1 and V2 of the metro volume already has a configured remote mirror. Put another way, V1 and V2 are configured as the same logical device with the same identity. When, for example, migrating V1 between the source and target appliances of system A, one intra-cluster migration approach can include creating yet another mirrored volume V3 having the same identity as the metro volume (e.g., the same identity as V1 and V2). However, the foregoing third volume V3 configured with the same identity as both V1 and V2 may not be allowed or supported.

To overcome the foregoing, the techniques of the present disclosure can be utilized. In at least one embodiment, the techniques of the present disclosure provide for intra-cluster migration of a volume included in the volume pair configured as the metro volume. The volume of a site or system can be migrated from a source to a target appliance within the same system or site in a non-disruptive manner with respect to external hosts or storage clients that access the metro volume. In at least one embodiment of the techniques of the present disclosure, host access to the metro volume can be non-disruptive. Additionally in at least one embodiment, the intra-cluster migration of a volume V1 included in a volume pair (V1,V2) configured as the metro volume can be performed i) without exceeding a maximum allowable number of target port groups that can be configured for the metro volume access; and ii) without having more than two volumes configured with the same identity of the metro volume at any point in time. Furthermore, at least one embodiment of the techniques of the present disclosure provide for performing the intra-cluster migration of V1 including fracturing the metro volume and its replication with the preferred or surviving site deterministically being internally set to the non-migration site or system independent of any user specified or default role assignments to the migration and non-migration sites or systems. After the intra-cluster migration of V1 in the migration site is complete and the migration cutover of V1 from the source to the target appliance of the migration site is complete, the metro volume and its associated replication can be resumed or enabled. Additionally, any default or user specified role assignments of preferred and non-preferred among the sites or systems can be restored where such role assignments can determine which of the sites or systems is the winner or sole surviving site that continues to services metro volume I/Os in the event that the metro volume is fractured such as due to any of a system failure, replication failure, metro volume pausing and/or metro volume disablement.

In at least one embodiment, a volume, such as V1, of the volume pair (V1, V2) configured as the metro volume can be migrated within a migration site or system. Before the migration, the metro volume can be accessible and available to external hosts or clients over paths to both the migration site or system and the non-migration site or system. The migration site or system can be the site that includes the volume, such as V1, to be migrated between appliances of the migration site. The non-migration site can be the remaining site such as the one including the remaining volume V2 of the metro volume pair.

During the migration, the techniques of the present disclosure in at least one embodiment can leverage the multipath access of the metro volume so that hosts solely access the metro volume at the remote non-migration system or site rather than the migration site or system including the volume being migrated. In at least one embodiment of the techniques of the present disclosure, processing can include i) pausing the metro volume associated replication; ii) detaching host access to the metro volume at the source appliance of the migration site including setting paths to the metro volume at the migration site as unavailable whereby host I/Os are then directed to only the non-migration site; and iii) after the volume has been migrated from the source to the target appliance of the migration site: a) resuming the previously paused metro volume associated replication, and b) reattaching host access to the metro volume at the target appliance, including setting paths to the metro volume at the target appliance of the migration site as active and available. In at least one embodiment, metro volume data changes, deltas or writes (which were received at the non-migration site while the metro volume is not available through the migration site) can be synchronized and sent from the non-migration site to the migration site before making the metro volume available through the migration site or system in connection with said reattaching.

In at least one embodiment, the techniques of the disclosure can provide for internally setting the role of the non-migration site to preferred and the role of the migration site to non-preferred during the intra-cluster migration independent of any user-specified settings for such roles. In at least one embodiment, a policy can specify a polarization rule or condition which is used when a metro volume is fractured such as due to a failure, disablement, and the like, in connection with the metro volume and its associated bi-directional replication. The fracture can be the result of an event occurrence that causes the associated metro volume replication to stop or pause temporarily. The polarization policy, rule or condition can specify that, in response to fracturing a metro volume, the preferred site or system is the sole site that continues to service I/O directed to the metro volume while fractured, and the metro volume is thus unavailable and/or inaccessible to hosts through the non-preferred site while the metro volume is fractured. In at least one embodiment, the polarization policy, rule or condition can also specify that if the preferred site or system is unavailable or has failed whereby the metro volume is unavailable through the preferred site, then the metro volume can be completely unavailable and inaccessible to the host through either the preferred or non-preferred sites. Put another way in this latter case where the preferred site is unavailable or has failed and cannot generally function to service metro volume I/Os, the metro volume can be unavailable to hosts through the non-preferred site.

In at least one embodiment, pausing the metro volume in connection with the volume intra-cluster migration can include disabling host access to the metro volume over paths to the migration site and also disabling and thus fracturing the metro volume and its replication. When the metro volume and its replication are disabled and fractured as part of pausing the metro-volume during the intra-cluster volume migration, all host I/Os directed to the metro volume can be deterministically directed to the non-migration site which is internally assigned the preferred role. After completing the intra-cluster migration of the volume (configured as part of the metro volume pair) within the migration site, processing can internally restore the roles of preferred and non-preferred to respective ones of the migration and non-migration site as prior to the intra-cluster migration. In at least one embodiment in connection with the intra-cluster migration of the volume within the migration site, any role changes or assignments made can be internal within the storage systems or sites and not exposed externally to a user. In at least one embodiment, a user can specify or assign the roles of preferred and non-preferred to the two sites exposing the same metro volume. Thus in at least one embodiment, the techniques of the present disclosure provide for ensuring that the preferred role is internally assigned to the non-migration site, independent of any user specified role assignments, during the intra-cluster migration so that deterministically the non-migration site solely services host I/Os directed to the metro volume when the metro volume is paused and thus fractured. After the intra-cluster migration is complete, processing in at least one embodiment can internally restore the role assignments of preferred and non-preferred to the respective sites as previously assigned by the user prior to the intra-cluster migration.

The foregoing and other aspects of the techniques of the present disclosure are described in more detail in the following paragraphs.

Referring to the FIG. 1, shown is an example of an embodiment of a system 10 that can be used in connection with performing the techniques described herein. The system 10 includes a data storage system 12 connected to the host systems (also sometimes referred to as hosts) 14*a*-14*n* through the communication medium 18. In this embodiment of the system 10, the n hosts 14*a*-14*n* can access the data storage system 12, for example, in performing input/output (I/O) operations or data requests. The communication medium 18 can be any one or more of a variety of networks or other type of communication connections as known to those skilled in the art. The communication medium 18 can be a network-connection, bus, and/or other type of data link, such as a hardwire or other connections known in the art. For example, the communication medium 18 can be the Internet, an intranet, network (including a Storage Area Network (SAN)) or other wireless or other hardwired connection(s) by which the host systems 14*a*-14*n* can access and communicate with the data storage system 12, and can also communicate with other components included in the system 10.

Each of the host systems 14*a*-14*n* and the data storage system 12 included in the system 10 are connected to the communication medium 18 by any one of a variety of connections in accordance with the type of communication medium 18. The processors included in the host systems 14*a*-14*n* and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software that can be included in the data storage system 12 are described herein in more detail, and can vary with each particular embodiment. Each of the hosts 14*a*-14*n* and the data storage system 12 can all be located at the same physical site, or, alternatively, can also be located in different physical locations. The communication medium 18 used for communication between the host systems 14*a*-14*n* and the data storage system 12 of the system 10 can use a variety of different communication protocols such as block-based protocols (e.g., SCSI (Small Computer System Interface), Fibre Channel (FC), iSCSI), file system-based protocols (e.g., NFS or network file server), and the like. Some or all of the connections by which the hosts 14*a*-14*n* and the data storage system 12 are connected to the communication medium 18 can pass through other communication devices, such as switching equipment, a phone line, a repeater, a multiplexer or even a satellite.

Each of the host systems 14*a*-14*n* can perform data operations. In the embodiment of the FIG. 1, any one of the host computers 14*a*-14*n* can issue a data request to the data storage system 12 to perform a data operation. For example, an application executing on one of the host computers 14*a*-14*n* can perform a read or write operation resulting in one or more data requests to the data storage system 12.

It should be noted that although the element 12 is illustrated as a single data storage system, such as a single data storage array, the element 12 can also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment can include data storage arrays or other components from one or more vendors. In subsequent examples illustrating the techniques herein, reference can be made to a single data storage array by a vendor. However, as will be appreciated by those skilled in the art, the techniques herein are applicable for use with other data storage arrays by other vendors and with other components than as described herein for purposes of example.

The data storage system 12 can be a data storage appliance or a data storage array including a plurality of data storage devices (PDs) 16*a*-16*n*. The data storage devices 16*a*-16*n* can include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contain no moving mechanical parts. The flash devices can be constructed using nonvolatile semiconductor NAND flash memory. The flash devices can include, for example, one or more SLC (single level cell) devices and/or MLC (multi level cell) devices.

The data storage array can also include different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs can be used to manage communications and data operations between one or more host systems and the global memory (GM). In an embodiment, the HA can be a Fibre Channel Adapter (FA) or other adapter which facilitates host communication. The HA 21 can be characterized as a front end component of the data storage system which receives a request from one of the hosts 14*a-n*. The data storage array can include one or more RAs used, for example, to facilitate communications between data storage arrays. The data storage array can also include one or more device interfaces 23 for facilitating data transfers to/from the data storage devices 16*a*-16*n*. The data storage device interfaces 23 can include device interface modules, for example, one or more disk adapters (DAs) (e.g., disk controllers) for interfacing with the flash drives or other physical storage devices (e.g., PDS 16*a-n*). The DAs can also be characterized as back end components of the data storage system which interface with the physical data storage devices.

One or more internal logical communication paths can exist between the device interfaces 23, the RAs 40, the HAs 21, and the memory 26. An embodiment, for example, can use one or more internal busses and/or communication modules. For example, the global memory portion 25*b* can be used to facilitate data transfers and other communications between the device interfaces, the HAs and/or the RAs in a data storage array. In one embodiment, the device interfaces 23 can perform data operations using a system cache included in the global memory 25*b*, for example, when communicating with other device interfaces and other components of the data storage array. The other portion 25*a* is that portion of the memory that can be used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14*a*-14*n* provide data and access control information through channels to the storage systems 12, and the storage systems 12 also provide data to the host systems 14*a-n* through the channels. The host systems 14*a-n* do not address the drives or devices 16*a*-16*n* of the storage systems directly, but rather access to data can be provided to one or more host systems from what the host systems view as a plurality of logical devices, logical volumes (LVs) which are sometimes referred to herein as logical units (e.g., LUNs). A logical unit (LUN) can be characterized as a disk array or data storage system reference to an amount of storage space that has been formatted and allocated for use to one or more hosts. A logical unit can have a logical unit number that is an I/O address for the logical unit. As used herein, a LUN or LUNs can refer to the different logical units of storage which can be referenced by such logical unit numbers. In some embodiments, at least some of the LUNs do not correspond to the actual or physical disk drives or more generally physical storage devices. For example, one or more LUNs can reside on a single physical disk drive, data of a single LUN can reside on multiple different physical devices, and the like. Data in a single data storage system, such as a single data storage array, can be accessed by multiple hosts allowing the hosts to share the data residing therein. The HAs can be used in connection with communications between a data storage array and a host system. The RAs can be used in facilitating communications between two data storage arrays. The DAs can include one or more type of device interface used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein can be made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22*a* that can be used to manage and monitor the data storage system 12. In one embodiment, the management system 22*a* can be a computer system which includes data storage system management software or application that executes in a web browser. A data storage system manager can, for example, view information about a current data storage configuration such as LUNs, storage pools, and the like, on a user interface (UI) in a display device of the management system 22*a*. Alternatively, and more generally, the management software can execute on any suitable processor in any suitable system. For example, the data storage system management software can execute on a processor of the data storage system 12.

Information regarding the data storage system configuration can be stored in any suitable data container, such as a database. The data storage system configuration information stored in the database can generally describe the various physical and logical entities in the current data storage system configuration. The data storage system configuration information can describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

It should be noted that each of the different controllers or adapters, such as each HA, DA, RA; and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16*a*-16*n*. In the following description, data residing on a LUN can be accessed by the device interface following a data request in connection with I/O operations. For example, a host can issue an IO operation which is received by the HA 21. The I/O operation can identify a target location from which data is read from, or written to, depending on whether the I/O operation is, respectively, a read or a write operation request. The target location of the received I/O operation can include a logical address expressed in terms of a LUN and logical offset or location (e.g., LBA or logical block address) on the LUN. Processing can be performed on the data storage system to further map the target location of the received I/O operation, expressed in terms of a LUN and logical offset or location on the LUN, to its corresponding physical storage device (PD) and address or location on the PD. The DA which services the particular PD can further perform processing to either read data from, or write data to, the corresponding physical device location for the I/O operation.

In at least one embodiment, a logical address LA1, such as expressed using a logical device or LUN and LBA, can be mapped on the data storage system to a physical address or location PA1, where the physical address or location PA1 contains the content or data stored at the corresponding logical address LA1. Generally, mapping information or a mapper layer can be used to map the logical address LA1 to its corresponding physical address or location PA1 containing the content stored at the logical address LA1. In some embodiments, the mapping information or mapper layer of the data storage system used to map logical addresses to physical addresses can be characterized as metadata managed by the data storage system. In at least one embodiment, the mapping information or mapper layer can be a hierarchical arrangement of multiple mapper layers. Mapping LA1 to PA1 using the mapper layer can include traversing a chain of metadata pages in different mapping layers of the hierarchy, where a page in the chain can reference a next page, if any, in the chain. In some embodiments, the hierarchy of mapping layers can form a tree-like structure with the chain of metadata pages denoting a path in the hierarchy from a root or top level page to a leaf or bottom level page.

It should be noted that an embodiment of a data storage system can include components having different names from that described herein but which perform functions similar to components as described herein. Additionally, components within a single data storage system, and also between data storage systems, can communicate using any suitable technique that can differ from that as described herein for exemplary purposes. For example, element 12 of the FIG. 1 can be a data storage system, such as a data storage array, that includes multiple storage processors (SPs). Each of the SPs 27 can be a CPU including one or more "cores" or processors and each having their own memory used for communication between the different front end and back end components rather than utilize a global memory accessible to all storage processors. In such embodiments, the memory 26 can represent memory of each such storage processor.

Generally, the techniques herein can be used in connection with any suitable storage system, appliance, device, and the like, in which data is stored. For example, an embodiment can implement the techniques herein using a midrange data storage system as well as a high end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path can be the logical flow through hardware and software components or layers in connection with issuing data storage management command to and/or from a data storage system, and also receiving responses (possibly including requested data) to such control or management commands. For example, with reference to the FIG. 1, the control commands can be issued from data storage management software executing on the management system 22*a* to the data storage system 12. Such commands can be, for example, to establish or modify data services, provision storage, perform user account management, and the like.

The data path and control path define two sets of different logical flow paths. In at least some of the data storage system configurations, at least part of the hardware and network connections used for each of the data path and control path can differ. For example, although both control path and data path can generally use a network for communications, some of the hardware and software used can differ. For example, with reference to the FIG. 1, a data storage system can have a separate physical connection 29 from a management system 22*a* to the data storage system 12 being managed whereby control commands can be issued over such a physical connection 29. However in at least one embodiment, user I/O commands are never issued over such a physical connection 29 provided solely for purposes of connecting the management system to the data storage system. In any case, the data path and control path each define two separate logical flow paths.

Figure 2:
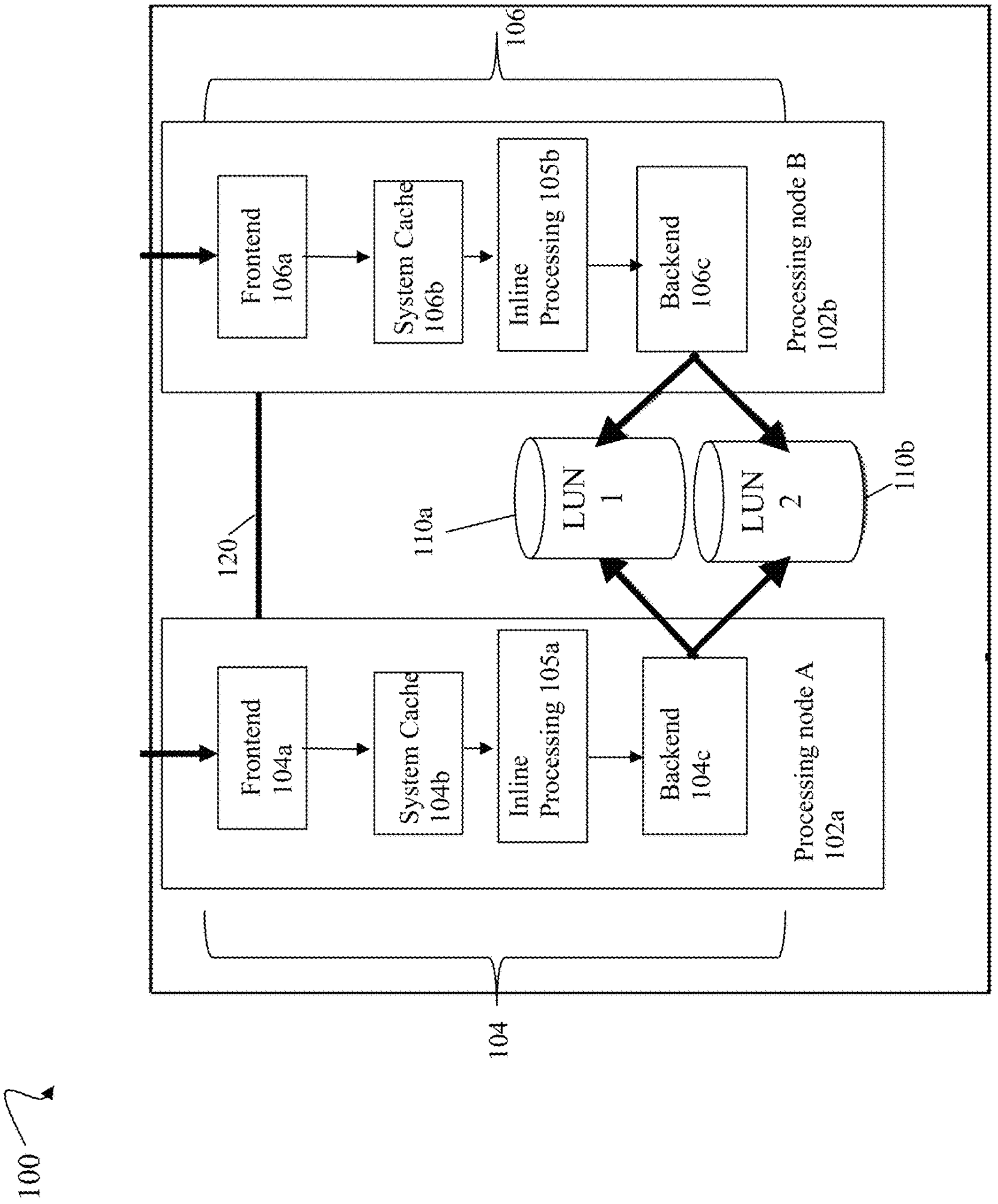
FIG. 2 is an example illustrating the I/O path or data path in connection with processing data in an embodiment in accordance with the techniques of the present disclosure.

With reference to the FIG. 2, shown is an example 100 illustrating components that can be included in the data path in at least one existing data storage system in accordance with the techniques herein. The example 100 includes two processing nodes A 102*a* and B 102*b* and the associated software stacks 104, 106 of the data path, where I/O requests can be received by either processing node 102*a* or 102*b*. In the example 200, the data path 104 of processing node A 102*a* includes: the frontend (FE) component 104*a* (e.g., an FA or front end adapter) that translates the protocol-specific request into a storage system-specific request; a system cache layer 104*b* where data is temporarily stored; an inline processing layer 105*a*; and a backend (BE) component 104*c* that facilitates movement of the data between the system cache and non-volatile physical storage (e.g., back end physical non-volatile storage devices or PDs accessed by BE components such as DAs as described herein). During movement of data in and out of the system cache layer 104*b* (e.g., such as in connection with read data from, and writing data to, physical storage 110*a*, 110*b*), inline processing can be performed by layer 105*a*. Such inline processing operations of 105*a* can be optionally performed and can include any one of more data processing operations in connection with data that is flushed from system cache layer 104*b* to the back-end non-volatile physical storage 110*a*, 110*b*, as well as when retrieving data from the back-end non-volatile physical storage 110*a*, 110*b* to be stored in the system cache layer 104*b*. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102*b* has its own FE component 106*a*, system cache layer 106*b*, inline processing layer 105*b*, and BE component 106*c* that are respectively similar to the components 104*a*, 104*b*, 105*a* and 104*c*. The elements 110*a*, 110*b* denote the non-volatile BE physical storage provisioned from PDs for the LUNs, whereby an I/O can be directed to a location or logical address of a LUN and where data can be read from, or written to, the logical address. The LUNs 110*a*, 110*b* are examples of storage objects representing logical storage entities included in an existing data storage system configuration. Since, in this example, writes directed to the LUNs 110*a*, 110*b* can be received for processing by either of the nodes 102*a* and 102*b*, the example 100 illustrates what is also referred to as an active-active configuration.

In connection with a write operation received from a host and processed by the processing node A 102*a*, the write data can be written to the system cache 104*b*, marked as write pending (WP) denoting it needs to be written to the physical storage 110*a*, 110*b* and, at a later point in time, the write data can be destaged or flushed from the system cache to the physical storage 110*a*, 110*b* by the BE component 104*c*. The write request can be considered complete once the write data has been stored in the system cache whereby an acknowledgement regarding the completion can be returned to the host (e.g., by component the 104*a*). At various points in time, the WP data stored in the system cache is flushed or written out to the physical storage 110*a*, 110*b*.

In connection with the inline processing layer 105*a*, prior to storing the original data on the physical storage 110*a*, 110*b*, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110*a*, 110*b*.

In connection with a read operation to read a block of data, a determination is made as to whether the requested read data block is stored in its original form (in system cache 104*b* or on physical storage 110*a*, 110*b*), or whether the requested read data block is stored in a different modified form or representation. If the requested read data block (which is stored in its original form) is in the system cache, the read data block is retrieved from the system cache 104*b* and returned to the host. Otherwise, if the requested read data block is not in the system cache 104*b* but is stored on the physical storage 110*a*, 110*b* in its original form, the requested data block is read by the BE component 104*c* from the backend storage 110*a*, 110*b*, stored in the system cache and then returned to the host.

If the requested read data block is not stored in its original form, the original form of the read data block is recreated and stored in the system cache in its original form so that it can be returned to the host. Thus, requested read data stored on physical storage 110*a*, 110*b* can be stored in a modified form where processing is performed by 105*a* to restore or convert the modified form of the data to its original data form prior to returning the requested read data to the host.

Also illustrated in FIG. 2 is an internal network interconnect 120 between the nodes 102*a*, 102*b*. In at least one embodiment, the interconnect 120 can be used for internode communication between the nodes 102*a*, 102*b*.

In connection with at least one embodiment in accordance with the techniques herein, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM which can used as main memory. The processor cache can be substantially faster than the system RAM such as used as main memory and contains information that the processor will be immediately and repeatedly accessing. The faster memory of the CPU cache can, for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105*a*, 105*b* as noted above, data can be loaded from the main memory and/or other lower cache levels into its CPU cache.

In at least one embodiment, the data storage system can be configured to include one or more pairs of nodes, where each pair of nodes can be described and represented as the nodes 102*a*-*b* in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102*a* is the peer node of the node B 102*b*, and the node B 102*b* is the peer node of the node A 102*a*.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes is not be shared with other pairs of nodes. A host can access data stored on a BE PD through the node pair associated with or attached to the PD.

In at least one embodiment, each pair of nodes provides a dual node architecture where both nodes of the pair can be identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Data replication is one of the data services that can be performed on a data storage system in an embodiment in accordance with the techniques herein. In at least one data storage system, remote replication is one technique that can be used in connection with providing for disaster recovery (DR) of an application's data set. The application, such as executing on a host, can write to a production or primary data set of one or more LUNs on a primary data storage system. Remote replication can be used to remotely replicate the primary data set of LUNs to a second remote data storage system. In the event that the primary data set on the primary data storage system is destroyed or more generally unavailable for use by the application, the replicated copy of the data set on the second remote data storage system can be utilized by the host. For example, the host can directly access the copy of the data set on the second remote system. As an alternative, the primary data set of the primary data storage system can be restored using the replicated copy of the data set, whereby the host can subsequently access the restored data set on the primary data storage system. A remote data replication service or facility can provide for automatically replicating data of the primary data set on a first data storage system to a second remote data storage system in an ongoing manner in accordance with a particular replication mode, such as a synchronous mode described elsewhere herein.

Figure 3:
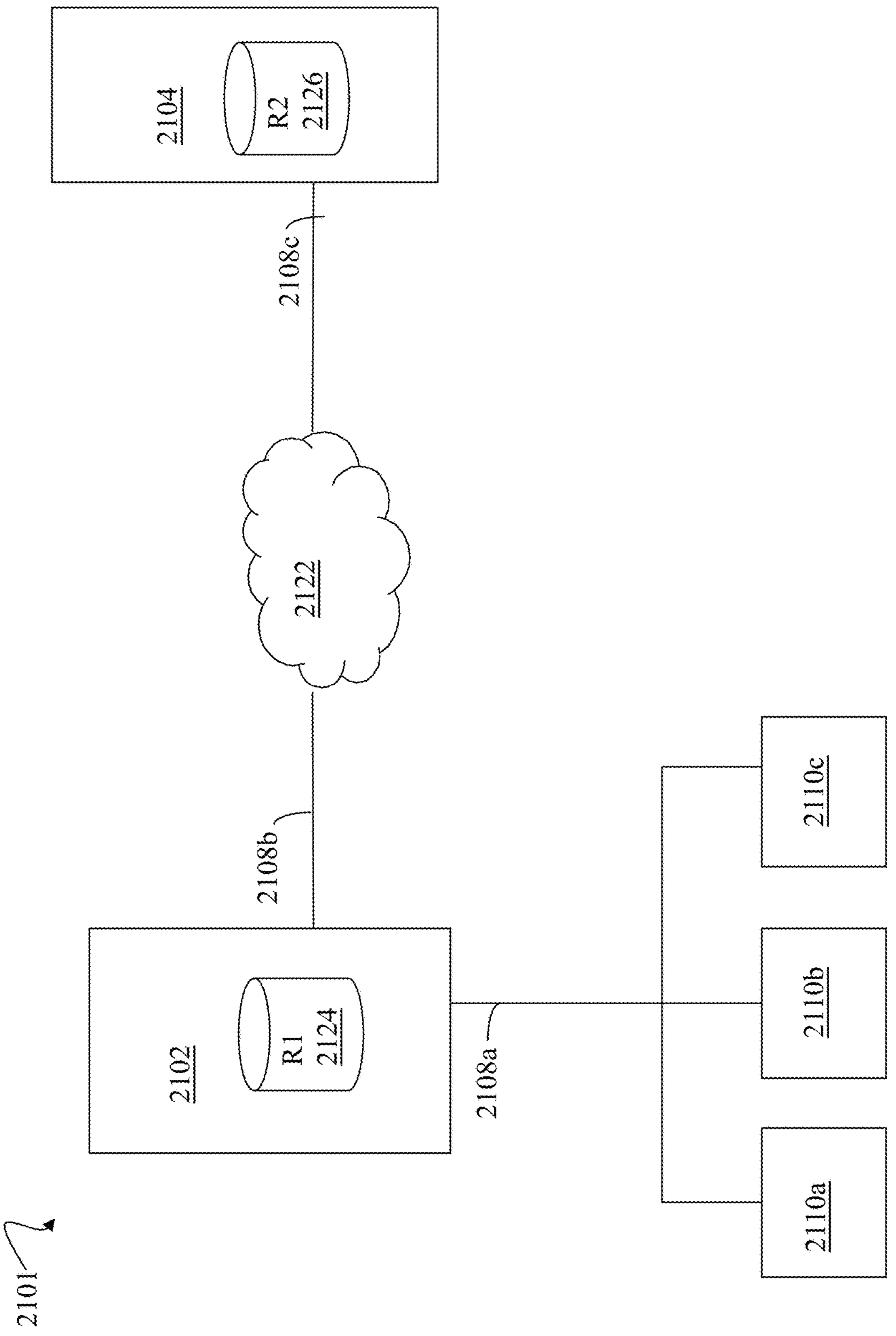
FIG. 3 is an example of an arrangement of systems that can be used in performing data replication.

Referring to FIG. 3, shown is an example 2101 illustrating remote data replication. It should be noted that the embodiment illustrated in FIG. 3 presents a simplified view of some of the components illustrated in FIGS. 1 and 2, for example, including only some detail of the data storage systems 12 for the sake of illustration.

Included in the example 2101 are the data storage systems 2102 and 2104 and the hosts 2110*a*, 2110*b* and 1210*c*. The data storage systems 2102, 2104 can be remotely connected and communicate over the network 2122, such as the Internet or other private network, and facilitate communications with the components connected thereto. The hosts 2110*a*, 2110*b* and 2110*c* can issue I/Os and other operations, commands, or requests to the data storage system 2102 over the connection 2108*a*. The hosts 2110*a*, 2110*b* and 2110*c* can be connected to the data storage system 2102 through the connection 2108*a* which can be, for example, a network or other type of communication connection.

The data storage systems 2102 and 2104 can include one or more devices. In this example, the data storage system 2102 includes the storage device R1 2124, and the data storage system 2104 includes the storage device R2 2126. Both of the data storage systems 2102, 2104 can include one or more other logical and/or physical devices. The data storage system 2102 can be characterized as local with respect to the hosts 2110*a*, 2110*b* and 2110*c*. The data storage system 2104 can be characterized as remote with respect to the hosts 2110*a*, 2110*b* and 2110*c*. The R1 and R2 devices can be configured as LUNs.

The host 2110*a* can issue a command, such as to write data to the device R1 of the data storage system 2102. In some instances, it can be desirable to copy data from the storage device R1 to another second storage device, such as R2, provided in a different location so that if a disaster occurs that renders R1 inoperable, the host (or another host) can resume operation using the data of R2. With remote replication, a user can denote a first storage device, such as R1, as a primary storage device and a second storage device, such as R2, as a secondary storage device. In this example, the host 2110*a* interacts directly with the device R1 of the data storage system 2102, and any data changes made are automatically provided to the R2 device of the data storage system 2104 by a remote replication facility (RRF). In operation, the host 2110*a* can read and write data using the R1 volume in 2102, and the RRF can handle the automatic copying and updating of data from R1 to R2 in the data storage system 2104. Communications between the storage systems 2102 and 2104 can be made over connections 2108*b*, 2108*c* to the network 2122.

An RRF can be configured to operate in one or more different supported replication modes. For example, such modes can include synchronous mode and asynchronous mode, and possibly other supported modes. When operating in the synchronous mode, the host does not consider a write I/O operation to be complete until the write I/O has been completed or committed on both the first and second data storage systems. Thus, in the synchronous mode, the first or source storage system will not provide an indication to the host that the write operation is committed or complete until the first storage system receives an acknowledgement from the second data storage system regarding completion or commitment of the write by the second data storage system. In contrast, in connection with the asynchronous mode, the host receives an acknowledgement from the first data storage system as soon as the information is committed to the first data storage system without waiting for an acknowledgement from the second data storage system. It should be noted that completion or commitment of a write by a system can vary with embodiment. For example, in at least one embodiment, a write can be committed by a system once the write request (sometimes including the content or data written) has been recorded in a cache. In at least one embodiment, a write can be committed by a system once the write request (sometimes including the content or data written) has been recorded in a persistent transaction log.

With synchronous mode remote data replication in at least one embodiment, a host 2110*a* can issue a write to the R1 device 2124. The primary or R1 data storage system 2102 can store the write data in its cache at a cache location and mark the cache location as including write pending (WP) data as mentioned elsewhere herein. At a later point in time, the write data is destaged from the cache of the R1 system 2102 to physical storage provisioned for the R1 device 2124 configured as the LUN A. Additionally, the RRF operating in the synchronous mode can propagate the write data across an established connection or link (more generally referred to as a the remote replication link or link) such as over 2108*b*, 2122, and 2108*c*, to the secondary or R2 data storage system 2104 where the write data is stored in the cache of the system 2104 at a cache location that is marked as WP. Subsequently, the write data is destaged from the cache of the R2 system 2104 to physical storage provisioned for the R2 device 2126 configured as the LUN A. Once the write data is stored in the cache of the system 2104 as described, the R2 data storage system 2104 can return an acknowledgement to the R1 data storage system 2102 that it has received the write data. Responsive to receiving this acknowledgement from the R2 data storage system 2104, the R1 data storage system 2102 can return an acknowledgement to the host 2110*a* that the write has been received and completed. Thus, generally, R1 device 2124 and R2 device 2126 can be logical devices, such as LUNs, configured as synchronized data mirrors of one another. R1 and R2 devices can be, for example, fully provisioned LUNs, such as thick LUNs, or can be LUNs that are thin or virtually provisioned logical devices.

Figure 4:
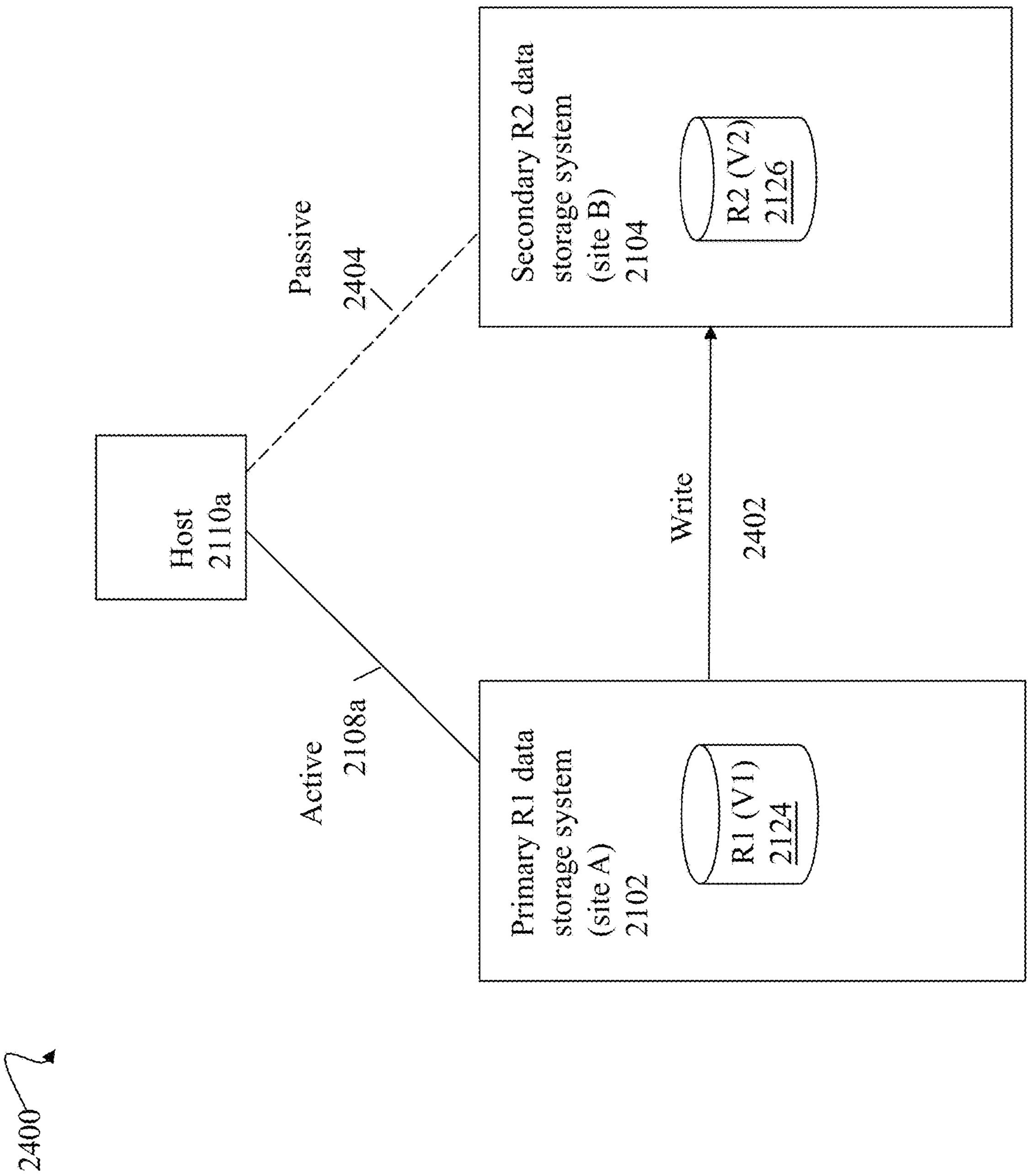
FIG. 4 is an example illustrating an active-passive replication configuration of a stretched volume using one-way synchronous replication in at least one embodiment.

With reference to FIG. 4, shown is a further simplified illustration of components that can be used in in connection with remote replication. The example 2400 is simplified illustration of components as described in connection with FIG. 2. The element 2402 generally represents the replication link used in connection with sending write data from the primary R1 data storage system 2102 to the secondary R2 data storage system 2104. The link 2402, more generally, can also be used in connection with other information and communications exchanged between the systems 2102 and 2104 for replication. As mentioned above, when operating in synchronous replication mode, host 2110*a* issues a write, or more generally, all I/Os including reads and writes, over a path to only the primary R1 data storage system 2102. The host 2110*a* does not issue I/Os directly to the R2 data storage system 2104. The configuration of FIG. 4 can also be referred to herein as an active-passive configuration with synchronous replication performed from the R1 data storage system 2102 to the secondary R2 system 2104. With the active-passive configuration of FIG. 4, the host 2110*a* has an active connection or path 2108*a* over which all I/Os are issued to only the R1 data storage system. The host 2110*a* can have a passive connection or path 2404 to the R2 data storage system 2104. Writes issued over path 2108*a* to the R1 system 2102 can be synchronously replicated to the R2 system 2104.

In the configuration of 2400, the R1 device 2124 and R2 device 2126 can be configured and identified as the same LUN, such as LUN A, to the host 2110*a*. Thus, the host 2110*a* can view 2108*a* and 2404 as two paths to the same LUN A, where path 2108*a* is active (over which I/Os can be issued to LUN A) and where path 2404 is passive (over which no I/Os to the LUN A can be issued whereby the host is not permitted to access the LUN A over path 2404). For example, in a SCSI-based environment, the devices 2124 and 2126 can be configured to have the same logical device identifier such as the same world-wide name (WWN) or other identifier as well as having other attributes or properties that are the same. Should the connection 2108*a* and/or the R1 data storage system 2102 experience a failure or disaster whereby access to R1 2124 configured as LUN A is unavailable, processing can be performed on the host 2110*a* to modify the state of path 2404 to active and commence issuing I/Os to the R2 device configured as LUN A. In this manner, the R2 device 2126 configured as LUN A can be used as a backup accessible to the host 2110*a* for servicing I/Os upon failure of the R1 device 2124 configured as LUN A.

The pair of devices or volumes including the R1 device 2124 and the R2 device 2126 can be configured as the same single volume or LUN, such as LUN A. In connection with discussion herein, the LUN A configured and exposed to the host can also be referred to as a stretched volume or device, where the pair of devices or volumes (R1 device 2124, R2 device 2126) is configured to expose the two different devices or volumes on two different data storage systems to a host as the same single volume or LUN. Thus, from the view of the host 2110*a*, the same LUN A is exposed over the two paths 2108*a* and 2404.

It should be noted although only a single replication link 2402 is illustrated, more generally any number of replication links can be used in connection with replicating data from systems 2102 to system 2104.

Figure 5:
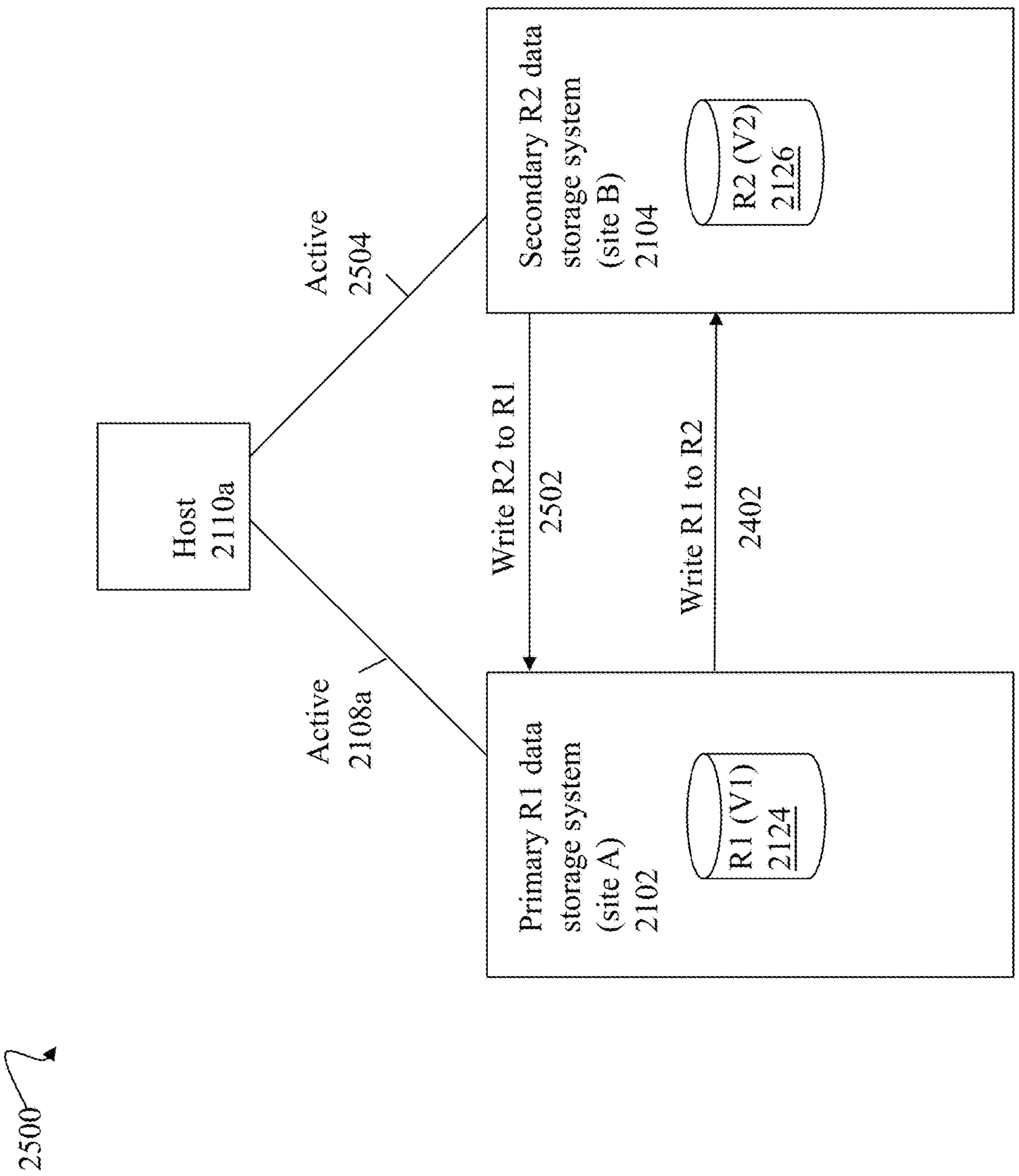
FIG. 5 is an example illustrating an active-active replication configuration of a stretched volume using two-way or bidirectional synchronous replication in at least one embodiment in accordance with the techniques of the present disclosure.

Referring to FIG. 5, shown is an example configuration of components that can be used in an embodiment. The example 2500 illustrates an active-active configuration as can be used in connection with synchronous replication in at least one embodiment. In the active-active configuration or state with synchronous replication, the host 2110*a* can have a first active path 2108*a* to the R1 data storage system and R1 device 2124 configured as LUN A. Additionally, the host 2110*a* can have a second active path 2504 to the R2 data storage system and the R2 device 2126 configured as the same LUN A. From the view of the host 2110*a*, the paths 2108*a* and 2504 appear as 2 paths to the same LUN A as described in connection with FIG. 4 with the difference that the host in the example 2500 configuration can issue I/Os, both reads and/or writes, over both of the paths 2108*a* and 2504 at the same time.

In at least one embodiment in a replication configuration of FIG. 5 with an active-active configuration where writes can be received by both systems or sites 2124 and 2126, a predetermined or designated one of the systems or sites 2124 and 2126 can be assigned as role as the preferred system or site, with the other remaining system or site assigned the role as the non-preferred system or site. In such an embodiment with a configuration as in FIG. 5, assume for purposes of illustration that system or site R1/A is assigned the preferred role and the system or site R2/B is assigned the non-preferred role.

The host 2110*a* can send a first write over the path 2108*a* which is received by the preferred R1 system 2102 and written to the cache of the R1 system 2102 where, at a later point in time, the first write is destaged from the cache of the R1 system 2102 to physical storage provisioned for the R1 device 2124 configured as the LUN A. The R1 system 2102 also sends the first write to the R2 system 2104 over the link 2402 where the first write is written to the cache of the R2 system 2104, where, at a later point in time, the first write is destaged from the cache of the R2 system 2104 to physical storage provisioned for the R2 device 2126 configured as the LUN A. Once the first write is written to the cache of the R2 system 2104, the R2 system 2104 sends an acknowledgement over the link 2402 to the R1 system 2102 that it has completed the first write. The R1 system 2102 receives the acknowledgement from the R2 system 2104 and then returns an acknowledgement to the host 2110*a* over the path 2108*a*, where the acknowledgement indicates to the host that the first write has completed.

The first write request can be directly received by the preferred system or site R1 2102 from the host 2110*a* as noted above. Alternatively in a configuration of FIG. 5 in at least one embodiment, a write request, such as the second write request discussed below, can be initially received by the non-preferred system or site R2 2104 and then forwarded to the preferred system or site 2102 for servicing. In this manner in at least one embodiment, the preferred system or site R1 2102 can always commit the write locally before the same write is committed by the non-preferred system or site R2 2104. In particular, the host 2110*a* can send the second write over the path 2504 which is received by the R2 system 2104. The second write can be forwarded, from the R2 system 2104 to the R1 system 2102, over the link 2502 where the second write is written to the cache of the R1 system 2102, and where, at a later point in time, the second write is destaged from the cache of the R1 system 2102 to physical storage provisioned for the R1 device 2124 configured as the LUN A. Once the second write is written to the cache of the preferred R1 system 2102 (e.g., indicating that the second write is committed by the R1 system 2102), the R1 system 2102 sends an acknowledgement over the link 2502 to the R2 system 2104 where the acknowledgment indicates that the preferred R1 system 2102 has locally committed or locally completed the second write on the R1 system 2102. Once the R2 system 2104 receives the acknowledgement from the R1 system, the R2 system 2104 performs processing to locally complete or commit the second write on the R2 system 2104. In at least one embodiment, committing or completing the second write on the non-preferred R2 system 2104 can include the second write being written to the cache of the R2 system 2104 where, at a later point in time, the second write is destaged from the cache of the R2 system 2104 to physical storage provisioned for the R2 device 2126 configured as the LUN A. Once the second write is written to the cache of the R2 system 2104, the R2 system 2104 then returns an acknowledgement to the host 2110*a* over the path 2504 that the second write has completed.

As discussed in connection with FIG. 4, the FIG. 5 also includes the pair of devices or volumes—the R1 device 2124 and the R2 device 2126—configured as the same single stretched volume, the LUN A. From the view of the host 2110*a*, the same stretched LUN A is exposed over the two active paths 2504 and 2108*a*.

In the example 2500, the illustrated active-active configuration includes the stretched LUN A configured from the device or volume pair (R1 2124, R2 2126), where the device or object pair (R1 2124, R2, 2126) is further configured for synchronous replication from the system 2102 to the system 2104, and also configured for synchronous replication from the system 2104 to the system 2102. In particular, the stretched LUN A is configured for dual, bi-directional or two way synchronous remote replication: synchronous remote replication of writes from R1 2124 to R2 2126, and synchronous remote replication of writes from R2 2126 to R1 2124. To further illustrate synchronous remote replication from the system 2102 to the system 2104 for the stretched LUN A, a write to the stretched LUN A sent over 2108*a* to the system 2102 is stored on the R1 device 2124 and also transmitted to the system 2104 over 2402. The write sent over 2402 to system 2104 is stored on the R2 device 2126. Such replication is performed synchronously in that the received host write sent over 2108*a* to the data storage system 2102 is not acknowledged as successfully completed to the host 2110*a* unless and until the write data has been stored in caches of both the systems 2102 and 2104.

In a similar manner, the illustrated active-active configuration of the example 2500 provides for synchronous replication from the system 2104 to the system 2102, where writes to the LUN A sent over the path 2504 to system 2104 are stored on the device 2126 and also transmitted to the system 2102 over the connection 2502. The write sent over 2502 is stored on the R2 device 2124. Such replication is performed synchronously in that the acknowledgement to the host write sent over 2504 is not acknowledged as successfully completed unless and until the write data has been stored in the caches of both the systems 2102 and 2104.

It should be noted that FIG. 5 illustrates a configuration with only a single host connected to both systems 2102, 2104 of the metro cluster. More generally, a configuration such as illustrated in FIG. 5 can include multiple hosts where one or more of the hosts are connected to both systems 2102, 2104 and/or one or more of the hosts are connected to only a single of the systems 2102, 2104.

Although only a single link 2402 is illustrated in connection with replicating data from systems 2102 to system 2104, more generally any number of links can be used. Although only a single link 2502 is illustrated in connection with replicating data from systems 2104 to system 2102, more generally any number of links can be used. Furthermore, although 2 links 2402 and 2502 are illustrated, in at least one embodiment, a single link can be used in connection with sending data from system 2102 to 2104, and also from 2104 to 2102.

FIG. 5 illustrates an active-active remote replication configuration for the stretched LUN A. The stretched LUN A is exposed to the host 2110*a* by having each volume or device of the device pair (R1 device 2124, R2 device 2126) configured and presented to the host 2110*a* as the same volume or LUN A. Additionally, the stretched LUN A is configured for two way synchronous remote replication between the systems 2102 and 2104 respectively including the two devices or volumes of the device pair, (R1 device 2124, R2 device 2126).

In the following paragraphs, sometimes the configuration of FIG. 5 can be referred to as a metro configuration or a metro replication configuration where the stretched volume of the metro configuration can also be referred to as a metro volume. The configurations of FIGS. 4 and 5 include two data storage systems 2102 and 2104 which can more generally be referred to as sites. In the following paragraphs, the two systems or sites 2102 and 2104 can be referred to respectively as site A and site B.

Consistent with discussion above, two data storage systems, sites or appliances, such as "site or system A" and "site or system B", can present a single data storage resource or object, such as a volume or logical device, to a client, such as a host. The volume can be configured as a stretched volume or resource where a first volume V1 on site A and a second volume V2 on site B are both configured to have the same identity from the perspective of the external host. The stretched volume can be exposed over paths going to both sites A and B.

In some systems, the stretched volume can be configured for one-way replication in either an asynchronous mode or a synchronous mode. When configured for one-way replication, a host or other client can issue I/Os, including writes, to only a single one of the systems or sites A and B, but not both. In some systems, the stretched volume can be included in a metro replication configuration (sometimes simply referred to as a metro configuration) where the host can issue I/Os, including writes, to the stretched volume over paths to both site A and site B, where writes to the stretched volume on each of the sites A and B are automatically synchronously replicated to the other peer site. In this manner with the metro replication configuration, the two data storage systems or sites can be configured for two-way or bi-directional synchronous replication for the configured stretched volume, and where such a stretched volume of a metro configuration configured for two-way or bi-directional synchronous replication can also be referred to as a metro volume.

In at least one embodiment, hosts and data storage systems can operate in accordance with the SCSI Asymmetrical Logical Unit Access (ALUA) standard. The ALUA standard specifies a mechanism for access of a logical unit or LUN, or more generally a logical device or volume, as used herein. ALUA allows the data storage system to set a LUN's access state with respect to a particular initiator and target. For each volume, ALUA allows for specifying preferred paths and non-preferred paths over which the volume is exposed, whereby a host can send I/Os to the volume over the preferred paths, and where the host can send I/Os to the volume over non-preferred paths only if there are no preferred paths available or in a functional state. Thus, volumes can be distributed between the nodes by setting path states such that a volume affined to a particular node can have paths to the particular node set to preferred and remaining paths to the remaining node set to non-preferred. In this manner, I/O workload of a volume can be directed to the affined node.

In an embodiment in accordance with the techniques of the present disclosure, the data storage systems can be SCSI-based systems such as SCSI-based data storage arrays. An embodiment in accordance with the techniques herein can include hosts and data storage systems which operate in accordance with the SCSI ALUA standard. The ALUA standard specifies a mechanism for asymmetric or symmetric access of a logical unit or LUN, or more generally a logical device or volume, as used herein. ALUA allows the data storage system to set a LUN's access state with respect to a particular initiator and target. Thus, in accordance with the ALUA standard, various access states can be associated with a path with respect to a particular device, such as a volume or LUN. In particular, the ALUA standard defines such access states including active-optimized, active-non optimized, unavailable and other states, some of which are described herein. The ALUA standard also defines other access states, such as standby and in-transition or transitioning (i.e., denoting that a particular path is in the process of transitioning between states for a particular LUN). A recognized path over which I/Os (e.g., read and write I/Os) can be issued and serviced to access data of a volume or LUN can have an "active" state, such as active-optimized ("AO") or active-non-optimized ("ANO"). In at least one embodiment, active-optimized is an active path to a LUN that is preferred over any other path for the LUN having an "active-non optimized" state. A path for a particular LUN having the active-optimized path state can also be referred to herein as an optimized or preferred path for the particular LUN. Thus active-optimized denotes a preferred path state for the particular LUN. A path for a particular LUN having the active-non optimized (or unoptimized) path state can also be referred to herein as a non-optimized or non-preferred path for the particular LUN. Thus active-non-optimized denotes a non-preferred path state with respect to the particular LUN.

In connection with path states such as ANO and AO for a particular LUN, the path can generally be between an initiator and a target. The initiator can generally denote an initiator of a command, request, I/O, and the like; and the target can generally denote a target that receives the command, request, I/O, and the like, from the initiator. In at least one embodiment, the initiator can send a command, request, or I/O, to the target thereby requesting or instructing the target to perform or service the command, request, or I/O. Generally, I/Os directed to a LUN that are sent by the initiator to the target over active-optimized and active-non optimized paths are processed by the target. In at least one embodiment for a multi-path configuration to a volume or LUN where the configuration includes both AO and ANO paths, the initiator can proceed to use a path having an active non-optimized or ANO state for the LUN only if there is no active-optimized or AO path for the LUN.

In connection with the SCSI standard in at least one embodiment, a path can be defined between an initiator and a target as noted above. A command can be sent from the initiator, originator or source with respect to the foregoing path. The initiator sends requests to the target, destination, receiver, or responder. Over each such path, one or more LUNs can be visible or exposed to the initiator.

In at least one embodiment, the host, or port thereof, can be an initiator with respect to I/Os issued from the host to a target port of the data storage system. In this case, the host and data storage system, and ports thereof, are examples, respectively, of such initiator and target endpoints where the LUN or volume can be exposed to the initiator over the path from the target.

In at least one embodiment in accordance with the techniques of the present disclosure, the initiator and target can more generally denote, respectively, any suitable initiator and target where one or more volumes or LUNs can be exposed by the target to the initiator. In at least one embodiment, a path over which multiple volumes or LUNs are exposed can be configured to a particular path state, such as AO or ANO, that varies with each individual volume or LUN.

Thus in at least one embodiment in accordance with ALUA where a volume or LUN is exposed to an initiator over multiple paths, an initiator can be instructed to send I/Os directed to the LUN over a first path of the multiple paths by setting the first path's state to AO and setting the remaining one or more multiple paths to have corresponding ANO states. The particular path states of the multiple paths can be communicated to the initiator. Additionally, any modifications made to such path states over time can also be communicated to the initiator so that the initiator can continue to use the AO path rather than the ANO path so long as the AO path is available to transmit and service I/Os.

As discussed above, two data storage systems or sites such as "site or system A" and "site or system B", can present a single data storage resource or object, such as a storage volume or logical device, to a client, such as a host. The volume can be configured as a stretched volume or resource where a first volume V1 on site A and a second volume V2 on site B are both configured to have the same identity, such as the same logical volume or device identity, from the perspective of the external host. The stretched volume can be exposed over paths going to both sites A and B.

In some systems, the stretched volume can be configured for one-way replication in either an asynchronous mode or a synchronous mode. When configured for one-way replication, a host or other client can issue I/Os, including writes, to only a single one of the systems or sites A and B, but not both. In some systems, the stretched volume can be included in a metro replication configuration (sometimes simply referred to as a metro configuration) where the host can issue I/Os, including writes, to the stretched volume over paths to both site A and site B, where writes to the stretched volume on each of the sites A and B are automatically synchronously replicated to the other peer site. In this manner with the metro replication configuration, the two data storage systems or sites can be configured for two-way or bi-directional synchronous replication for the configured stretched volume. A stretched volume configured for two-way or bi-directional synchronous replication in the metro replication configuration can also sometimes be referred to as a metro volume.

In at least one embodiment, a data storage system or site can be configured as a cluster of multiple storage appliances. A volume can be migrated between appliances of the same cluster or data storage system, for example, for load balancing or other suitable purpose. In at least one embodiment, a metro volume can be configured from a volume pair V1 of site A and V2 of site B, where site A and/or site B can be a data storage system configured as a cluster of multiple storage appliances. Thus in at least one embodiment, the metro volume can be configured in a replication configuration between two clusters of two respective sites or data storage systems, where each such cluster can include one or more appliances. In at least one embodiment, each of the two clusters of the two respective storage systems can include multiple appliances.

One approach that can be used for migrating a volume, such as volume A, of system A between storage appliances of the same cluster of system A, where the volume A is configured in a volume pair of a metro volume, can include i) ending and disabling the metro volume configuration and associated replication; ii) once the metro volume configuration and replication are ended or disabled, the standalone volume A can be migrated within the site or system A cluster from a source to a target storage appliance of the cluster of system A; and iii) once volume A migration between storage appliances of system A is complete, the corresponding metro volume and replication can be reconfigured and enabled whereby the two way synchronous replication of the metro volume can resume.

The foregoing approach can have associated drawbacks. One drawback can be related to a maximum number of target port groups supported for a metro volume across both sites or systems A and B. In at least one embodiment, a maximum number of 4 target port groups can be allowed to be configured for the metro volume, and thus collectively for V1 and V2 configured as the metro volume, across systems A and B. A host or external client can be configured to access V1 through 2 target port groups of system A and 2 additional target port groups of system B so that the 4 target port group limit is met. Some intra-cluster migration approaches, such as for migrating V1 from a source to a target appliance in cluster A of system A, can include extending host access to the target appliance over yet 2 more target port groups of system A during the migration thereby having the metro volume configured for access over 6 target port groups during the intra-cluster migration of volume A. Put another way, extending host access during the intra-cluster migration of volume A from the source to the target appliance of system A can include further configuring volume A to be accessible over yet an additional 2 target port groups of the target appliance while also maintaining i) the existing access of volume A over 2 target port groups of the source appliance, and ii) the existing access of volume B over 2 target port groups of an appliance of system B. Thus, extending host access during the intra-cluster migration of volume A on system A can utilize a total of 6 target port groups thereby exceeding the allowed maximum of 4 target port groups.

Yet another drawback of the foregoing approach is that only one mirror can be supported for a volume. In this manner, each of V1 and V2 of the metro volume already has a configured remote mirror. Put another way, V1 and V2 are configured as the same logical device with the same identity. When, for example, migrating V1 between the source and target appliances of system A, one intra-cluster migration approach can include creating yet another mirrored volume V3 having the same identity as the metro volume (e.g., the same identity as V1 and V2). However, the foregoing third volume V3 configured with the same identity as both V1 and V2 may not be allowed or supported.

To overcome the foregoing, the techniques of the present disclosure can be utilized. In at least one embodiment, the techniques of the present disclosure provide for intra-cluster migration of a volume included in the volume pair configured as the metro volume. The volume of a site or system can be migrated from a source to a target appliance within the same system or site in a non-disruptive manner with respect to external hosts or storage clients that access the metro volume. In at least one embodiment of the techniques of the present disclosure, host access to the metro volume can be non-disruptive. Additionally in at least one embodiment, the intra-cluster migration of a volume V1 included in a volume pair (V1,V2) configured as the metro volume can be performed i) without exceeding a maximum allowable number of target port groups that can be configured for the metro volume access; and ii) without having more than two volumes configured with the same identity of the metro volume at any point in time. Furthermore, at least one embodiment of the techniques of the present disclosure provide for performing the intra-cluster migration of V1 including fracturing the metro volume and its replication with the preferred or surviving site deterministically being internally set to the non-migration site or system independent of any user specified or default role assignments to the migration and non-migration sites or systems. After the intra-cluster migration of V1 in the migration site is complete and the migration cutover of V1 from the source to the target appliance of the migration site is complete, the metro volume and its associated replication can be resumed or enabled. Additionally, any default or user specified role assignments of preferred and non-preferred among the sites or systems can be restored where such role assignments can determine which of the sites or systems is the winner or sole surviving site that continues to services metro volume I/Os in the event that the metro volume is fractured such as due to any of a system failure, replication failure, metro volume pausing and/or metro volume disablement.

In at least one embodiment, a volume, such as V1, of the volume pair (V1, V2) configured as the metro volume can be migrated within a migration site or system. Before the migration, the metro volume can be accessible and available to external hosts or clients over paths to both the migration site or system and the non-migration site or system. The migration site or system can be the site that includes the volume, such as V1, to be migrated between appliances of the migration site. The non-migration site can be the remaining site such as the one including the remaining volume V2 of the metro volume pair.

During the migration, the techniques of the present disclosure in at least one embodiment can leverage the multi-path access of the metro volume so that hosts solely access the metro volume at the remote non-migration system or site rather than the migration site or system including the volume being migrated. In at least one embodiment of the techniques of the present disclosure, processing can include i) pausing the metro volume associated replication; ii) detaching host access to the metro volume at the source appliance of the migration site including setting paths to the metro volume at the migration site as unavailable whereby host I/Os are then directed to only the non-migration site; and iii) after the volume has been migrated from the source to the target appliance of the migration site: a) resuming the previously paused metro volume associated replication, and b) reattaching host access to the metro volume at the target appliance, including setting paths to the metro volume at the target appliance of the migration site as active and available. In at least one embodiment, metro volume data changes, deltas or writes (which were received at the non-migration site while the metro volume is not available through the migration site) can be synchronized and sent from the non-migration site to the migration site before making the metro volume available through the migration site or system in connection with said reattaching.

In at least one embodiment, the techniques of the disclosure can provide for internally setting the role of the non-migration site to preferred and the role of the migration site to non-preferred during the intra-cluster migration independent of any user-specified settings for such roles. In at least one embodiment, a policy can specify a polarization rule or condition which is used when a metro volume is fractured such as due to a failure, disablement, and the like, in connection with the metro volume and its associated bi-directional replication. The fracture can be the result of an event occurrence that causes the associated metro volume replication to stop or pause temporarily. The polarization policy, rule or condition can specify that, in response to fracturing a metro volume, the preferred site or system is the sole site that continues to service I/O directed to the metro volume while fractured, and the metro volume is thus unavailable and/or inaccessible to hosts through the non-preferred site while the metro volume is fractured. In at least one embodiment, the polarization policy, rule or condition can also specify that if the preferred site or system is unavailable or has failed whereby the metro volume is unavailable through the preferred site, then the metro volume can be completely unavailable and inaccessible to the host through either the preferred or non-preferred sites. Put another way in this latter case where the preferred site is unavailable or has failed and cannot generally function to service metro volume I/Os, the metro volume can be unavailable to hosts through the non-preferred site.

In at least one embodiment, pausing the metro volume in connection with the volume intra-cluster migration can include disabling host access to the metro volume over paths to the migration site and also disabling and thus fracturing the metro volume and its replication. When the metro volume and its replication are disabled and fractured as part of pausing the metro-volume during the intra-cluster volume migration, all host I/Os directed to the metro volume can be deterministically directed to the non-migration site which is internally assigned the preferred role. After completing the intra-cluster migration of the volume (configured as part of the metro volume pair) within the migration site, processing can internally restore the roles of preferred and non-preferred to respective ones of the migration and non-migration site as prior to the intra-cluster migration. In at least one embodiment in connection with the intra-cluster migration of the volume within the migration site, any role changes or assignments made can be internal within the storage systems or sites and not exposed externally to a user. In at least one embodiment, a user can specify or assign the roles of preferred and non-preferred to the two sites exposing the same metro volume. Thus in at least one embodiment, the techniques of the present disclosure provide for ensuring that the preferred role is internally assigned to the non-migration site, independent of any user specified role assignments, during the intra-cluster migration so that deterministically the non-migration site solely services host I/Os directed to the metro volume when the metro volume is paused and thus fractured. After the intra-cluster migration is complete, processing in at least one embodiment can internally restore the role assignments of preferred and non-preferred to the respective sites as previously assigned by the user prior to the intra-cluster migration.

In at least one embodiment, a stretched volume can generally denote a single stretched storage resource or object configured from two local storage resources, objects or copies, respectively, on the two different sites or storage systems A and B, where the local two storage resources are configured to have the same identity as presented to a host or other external client. Sometimes, a stretched volume of a metro configuration can also be referred to herein as a metro volume. More generally, sometimes a stretched storage resource or object of a metro configuration can be referred to herein as a metro storage object or resource.

In at least one embodiment, a stretched resource or object can be any one of a set of defined resource types including one or more of: a volume, a logical device; a file; a file system; a sub-volume portion; a virtual volume used by a virtual machine; a portion of a virtual volume used by a virtual machine; a portion of a file system; a directory of files; and/or a portion of a directory of files. Thus although the techniques of the present disclosure can be described herein with reference to stretched or metro volumes or logical devices, the techniques of the present disclosure can more generally be applied for use in connection with any suitable metro or stretched resource or object.

In at least one embodiment, a storage object group or resource group construct can also be utilized where the group can denote a logically defined grouping of one or more storage objects or resources such as volumes. In particular in at least one embodiment, there can be a first group GP1 of volumes of system A and a second group GP2 of corresponding volumes of system B, where each volume V1 of GP1 can have a corresponding volume V2 of GP2 where V1 and V2 denote a volume pair configured as a metro volume. For example, GP1 can include 3 volumes A1, A2 and A3, and GP2 can include 3 volumes B1, B2 and B3, where each Ai of GP1 has a corresponding Bi of GP2, and where each Ai and Bi denote a corresponding volume pair configured as a metro volume where Ai and Bi have the same volume identity when presented to the host over paths from respective sites or systems A and B. Thus, the foregoing GP1 and GP2 can denote volume groups for 3 metro volumes. More generally, each resource group or object group GP1, GP2 can denote a logically defined grouping of one or more objects or resources configured in connection with metro objects or resources. In at least one embodiment, the techniques of the present disclosure can be used in connection with migrating a group of volumes, such as GP1 or GP2, from a source appliance to a target appliance of the same system or site.

The foregoing group construct of resources or objects can be used for any suitable purpose depending on the particular functionality and services supported for the group. For example in at least one embodiment, data protection can be supported at the group level such as in connection with snapshots. Taking a snapshot of the group can include taking a snapshot of each of the members at the same point in time. The group level snapshot can provide for taking a snapshot of all group members and providing for write order consistency among all snapshots of group members.

An application executing on a host can use such group constructs to create consistent write-ordered snapshots across all volumes, storage resources or storage objects in the group. Applications that require disaster tolerance can use the metro configuration with a volume group to have higher availability. Consistent with other discussion herein, such a volume group of metro or stretched volumes can sometimes be referred to as a metro volume group or metro group.

In at least one embodiment, metro volume groups can be used to maintain and preserve write consistency and dependency across all stretched or metro LUNs or volumes which are members of the metro volume group. Thus, write consistency can be maintained across, and with respect to, all stretched volumes or LUNs (or more generally all resources or objects) of the metro volume group whereby, for example, all members of the metro volume group denote copies of data with respect to a same point in time. In at least one embodiment, a snapshot can be taken of a metro volume group at the same particular point in time, where the group-level snapshot includes snapshots of all LUNs or volumes of the metro volume group across both sites or systems A and B where such snapshots of all LUNs or volumes are write order consistent. Thus such a metro volume group level snapshot of a metro volume group GP1 can denote a crash consistent and write order consistent copy of the stretched LUNs or volumes which are members of the metro volume group GP1. To further illustrate, a first write W1 can write to a first stretched volume or LUN 10 of GP1 at a first point in time. Subsequently at a second point in time, a second write W2 can write to a second stretched volume or LUN 11 of GP1 at the second point in time. A metro volume group snapshot of GP1 taken at a third point in time immediately after completing the second write W2 at the second point in time can include both W1 and W2 to maintain and preserve the write order dependency as between W1 and W2. For example, the metro volume group snapshot of GP1 at the third point in time would not include W2 without also including W1 since this would violate the write order consistency of the metro volume group. Thus, to maintain write consistency of the metro volume group, a snapshot is taken at the same point in time across all volumes, LUNs or other resources or objects of the metro volume group to keep the point-in-time image write order consistent for the entire group.

In at least one embodiment, the migration processing can include performing an initial synch or synchronization of the source volume and the target volume of the migration site. For example, processing can including taking an initial snapshot of the source volume and copying the content of the snapshot of source volume to the target volume. The initial synchronization or snapshot can include all content currently stored on the source volume.

In at least one embodiment, the migration processing can include a migration cutover stage or processing to switch using the source volume of a source appliance to the target volume of a target appliance, where both the source and target appliances are in the same migration site or system. The migration cutover stage can include performing delta synchronizations on a migration session which migration the source volume to the target volume to reduce data differences between the source and target volumes. During the initial synchronization and the delta synchronizations in at least one embodiment, host write I/Os can be directed to the metro volume where such write I/Os can be either i) received at the migration site OR ii) received at the non-migration site and then, via the metro replication configuration, migrated to the remaining other site.

In at least one embodiment, the migration cutover stage can include pausing the metro volume and its replication including disabling or fracturing the metro volume replication so that there is no replication of writes between the migration and non-migration sites. In at least one embodiment, after pausing the metro volume and its replication, processing can include disabling host access over paths to the source appliance 1, or more generally, disabling host access to the metro volume from the migration system or site.

In at least one embodiment, pausing can include fracturing, disabling or stopping the metro volume replication session in favor of the non-migrating site so that the non-migrating site remains online and continues to service all host I/Os directed to the metro volume, and where the metro volume is otherwise unavailable through the migrating site.

The foregoing and other aspects of the techniques of the present disclosure are set forth in the following paragraphs.

In at least one embodiment for a metro configuration for a metro volume such as illustrated in FIG. 5, a user can configure which of the data storage systems or sites is assigned the role of preferred and which is assigned the role of non-preferred. In the event a metro volume is fractured such as due to metro replication failure or disabling the metro replication, the preferred DS (data storage system) or site can continue to service I/Os directed to the metro volume and the where the non-preferred DS or site does not service I/Os directed to the metro volume. In this case, the metro volume can be unavailable over paths of the non-preferred DS or site so that no host UOs can be serviced over such paths to the non-preferred DS or site.

In at least one embodiment in accordance with the techniques of the present disclosure, independent of which DS or site of a metro configuration a user has configured with the preferred role, the techniques of the present disclosure can internally manage the roles of preferred site or DS and non-preferred site or DS for the metro volume configuration such that the non-migrating site or DS is internally assigned the role of preferred and such that the migrating site or DS is internally assigned the role of non-preferred when the metro volume is fractured. In this case in connection with the pause processing for the metro volume replication, the preferred site or DS is always the non-migrating site and the non-preferred site or DS is always the migrating site. In at least one embodiment, the foregoing role assignment of preferred to the non-migrating site and assignment of non-preferred to the migrating site can be internal within the storage system and not exposed or made visible to the user. To the user, the user can view their current role assignments of preferred and non-preferred to particular storage systems or sites of the metro configuration. However, during the migration using the techniques of the present disclosure, prior to pausing and thus fracturing the metro volume replication, processing can include performing any needed modifications to internally change the role assignments so that the foregoing preferred role is assigned to the non-migrating site and the non-preferred role is assigned to the migrating site. The foregoing internal role assignment of preferred role to the non-migrating site and non-preferred role to the migrating site can be used in determining the winner and loser with respect to the metro volume fracture during the migration process.

To further illustrate, the user may have configured the migrating site or system with the preferred role and the non-migrating site or system with the non-preferred role. Prior to pausing the metro configuration for the metro volume in at least one embodiment, processing can include i) internally changing the role of the migrating site to non-preferred and ii) internally changing the role of the non-migrating site to preferred. In this manner, subsequently fracturing, stopping or disabling the metro volume configuration and its replication in the pausing step can result in i) the non-migrating site having the preferred role remaining as the winner site that services host I/Os directed to the metro volume and ii) the migrating site having the non-preferred role being the loser site that is unavailable to service host I/Os directed to the metro volume (e.g., the metro volume is not available to external hosts over paths from the non-preferred migrating site). Put another way, in response to fracturing or disabling the metro volume configuration and its replication, a polarization rule, policy or other logic can be configured to select only one of the sites A and B as the winner or sole surviving site which is to subsequently remain online servicing I/Os to the metro volume in response to fracturing the metro volume and its replication. In this manner, the winner can be the single particular system or site, the non-migration site, with the preferred role and the loser can be the particular system or site, the migration site, with the non-preferred role; and processing can include setting appropriate path states to the non-preferred migration site to unavailable so that the metro volume is not available or exposed to hosts over such paths to the migration site. In this case when the metro volume is fractured during the migration processing of the techniques of the present disclosure, the metro volume can be exposed over only paths to the preferred non-migration site so that all host I/Os are directed solely to the non-migration site. By performing such internal role assignments such that the non-migration site is always preferred and is the only one of the two sites that continues servicing I/Os directed to the metro volume during the migration, the techniques of the present disclosure provide for a deterministic behavior when the metro volume is fractured during the migration in always selecting the non-migrating site as the winner or sole surviving site which is to subsequently service I/Os to the metro volume during the migration once the metro volume and its replication are fractured.

As described in more detail below, the techniques of the present disclosure can further provide for internally restoring the preferred and non-preferred roles to the particular sites or systems as configured or specified by the user after the migration processing has completed. In at least one embodiment consistent with discussion above, such changes to the role assignments of preferred and non-preferred during the migration process can be performed internally within the storage systems and not exposed to the user. Subsequent to completing the migration, processing can internally restore any user-specified or default preferred and non-preferred role assignments among the two sites configured for the metro volume. In this manner, the techniques of the present disclosure provide for internally making any needed changes regarding preferred and non-preferred role assignments among the migration site and non-migration site that are in effect and impactful during the migration, and then internally performing any needed restoration of the preferred and non-preferred role assignments among the migration and non-migration sites based, at least in part, on any user specified role assignments. In at least one embodiment, any changes made internally to the foregoing role assignments may not be exposed or made visible to the user.

During the migration in at least one embodiment, the techniques of the present disclosure provide for changing the metro replication fracture or failure behavior in a deterministic manner internally so that the non-migrating site is always the preferred site or winner that remains online as the sole site servicing I/Os to the metro volume when the metro volume is fractured during the migration process such that the corresponding replication for the metro volume configuration is disabled, failed and/or stopped.

In at least one embodiment, replication for the metro volume can be suspended via the pause during the cutover phase. Once the cut over or change from the source volume of the source appliance to the target volume of the target appliance is complete, the metro volume and its associated replication can be resumed using the target volume of the target appliance rather than the source volume of the source appliance.

What will now be described are examples illustrating use of the techniques of the present disclosure in at least one embodiment with a metro volume having the identity of LUN or volume X1 configured from a volume pair (V1A, V2) where V1A and V2 are both configured to have the same identity X1. V1A can be located in a first storage system or site DS A and V2 can be located in a second system or site DS B. In the following example, processing can be performed to perform an intra-cluster or intra site migration from the source volume V1A to the target volume V1B, where both V1A and V1B are located in different appliances of DS or site A. Before the migration, metro volume X1 can be configured from the volume pair (V1A, V2); and after the migration, the metro volume X1 can be configured from the volume pair (V1B, V2) where V1B and V2 are configured to have the same identity X1.

Figure 6A:
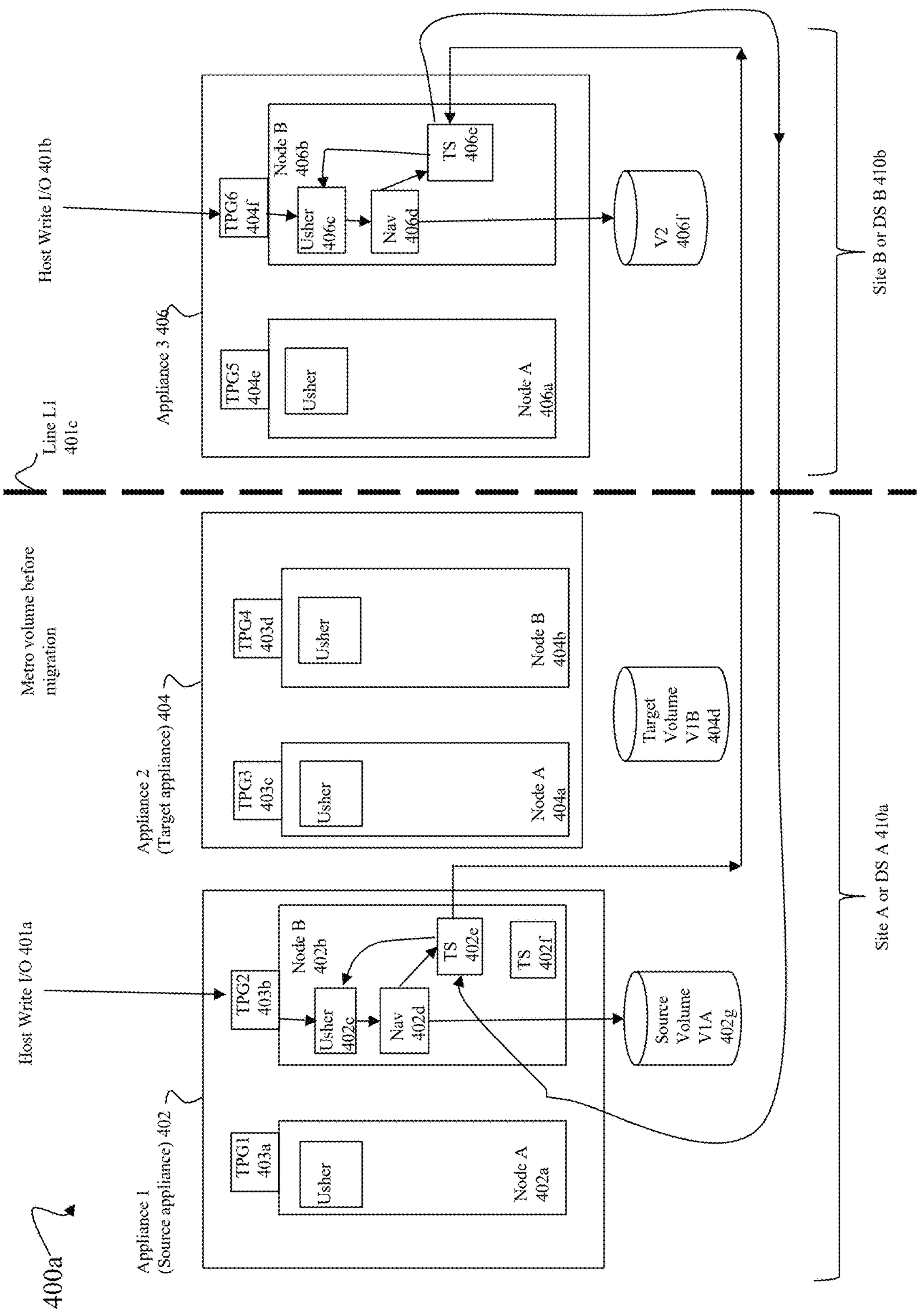
FIGS. 6A, 6B, 6C and 6D illustrate components and processing flows at various points in time in at least one embodiment in accordance with the techniques of the present disclosure.

Referring to FIG. 6A, shown is an example 400*a* illustrating the state of the systems in at least one embodiment prior to performing the intra-cluster migration with the metro volume X1 configured for bi-directional replication.

Components to the left of the line L1 401*c* can be included in a first site or system, DS A or site A 410*a*, and components to the right of the line L1 401*c* can be included in a second site or system, DS B or site B 410*b*. DS A 410*a* can include a first cluster of appliances 402 and 404; and DS B 410*b* can include a second cluster of the single appliance 406. Although DS B 410*b* illustrates a cluster with only a single appliance, more generally, DSB 410*b* can be a cluster of one or more appliances. In this example, DS A 410*a* can be the migration system or site, and DS B 410*b* can be the non-migration system or site whereby DS A 410*a* is the system or site within which the volume migration is performed from the source volume V1A 402*g* to the target volume V1B 404*d*. Prior to the migration as illustrated in FIG. 6A, the metro volume X1 can be configured for two-way or bi-directional synchronous replication from the volume pair (V1A 402*g*, V2 406*f*). After the migration is complete (as illustrated in connection with another subsequent figure), the metro volume X1 is configured from the volume pair (V1B 404*d*, V2 406*f*). The appliance 402 can be the source appliance including the source volume V1A 402*g* of the migration, and the appliance 404 can be the target appliance including the target volume V1B 404*d* of the migration.

Each of the appliances 402, 404 and 406 can be dual node appliances, such as illustrated in FIG. 2. Each of the appliance nodes can include a corresponding target port group (TPG) denoted TPGi where the TPG includes multiple front end storage system ports providing connectivity between a respective storage system and external hosts.

The source appliance 402 can include nodes 402*a-b*, where node A 402*a* includes TPG1 403*a*, and where node B 402*b* includes TPG2 403*b*. The target appliance 404 can include nodes 404*a-b*, where node A 404*a* includes TPG3 403*c*, and where node B 404*b* includes TPG4 403*d*. The appliance 406 of DS B can include nodes 406*a-b* where node A 406*a* includes TPG5 404*e*, and where node B 406*b* includes TPG6 404*f*.

In FIG. 6A and others discussed herein, various components of the I/O path or data path are illustrated that can be used in connection the techniques of the present disclosure. More generally, any suitable components can be used in connection with the techniques of the present disclosure. In at least one embodiment, the components can include usher, navigator (nav) and transit (TS). Each instance of usher can generally be an I/O handler of a particular node. For example, usher 402*c* can denote the I/O handler of the node 403*b*, and usher 406*c* can denote the I/O handler of the node 406*b*. Each instance of usher can be configured to receive I/O requests and relay them within the respective node, site and/or system. Each instance of nay, such as 402*d*, 406*d*, can be configured to direct I/O requests within a respective site or system and/or to external systems and devices. Each TS instance, such as 402*e*, 402*f* and 406*e*, of a first site or system can be configured to transmit and communicate with a second site or system, such as to another TS instance of the second site or system.

Prior to the migration as illustrated in FIG. 6A, the metro volume X1 can be configured from the volume pair (V1A 402*g*, V2 406*f*) consistent with discussion above. In this case with the configured bi-directional replication for the metro volume X1, i) writes to the metro volume received at DS A 410*a* are applied to V1A 402*g*, and also replicated to DS B 410*b* and applied to V2 406*f*; and ii) writes to the metro volume X1 received at DS B 410*b* are applied to V2 406*f*, and also replicated to DS A 410A and applied to V1A 402*g*. The metro volume X1 can be exposed to external hosts over 4 TPGs 403*a-b* and 404*e-f*. Prior to the migration, the metro volume X1 is not exposed over TPGs 403*c-d*.

In at least one embodiment, the metro volume X1 can be exposed over paths from TPGs 403*a-b*, 404*e-f*, where paths to TPGs 403*a* and 404*e* over which the metro volume X1 is exposed can be set to the ALUA path state of ANO (active non-optimized or non-preferred), and where paths to TPGs 403*b* and 404*f* over which the metro volume X1 is exposed can be set to the ALUA path state of AO (active optimized or preferred). Based on the foregoing path states in normal operation, host I/Os directed to the metro volume X1 can be sent over the active optimized (AO) paths to the target ports of the TPGs 403*b* and 404*f*.

For the metro volume X1, host writes 401*a* to the metro volume received at TPG2 403*b* of DS A 410*a* are applied to V1A 402*g*, and also replicated to DS B 410*b* and applied to V2 406*f*. In further detail in at least one embodiment, a host write 401*a* received at the TPG 403*b* of DS A 410*a* can be serviced by sending the host write 401*a* to the following sequence of components in connection with applying the write 401*a* to the source volume V1A 402*g*: usher 402*c*, nav 402*d*, and the volume V1A 402*g*. The host write 401*a* received at TPG 403*b* of DS A 410*a* can be replicated to DS B 410*b* by sending the host write 401*a* to the following sequence of components: usher 402*c*, nav 402*d*, TS 402*e*, TS 406*e*, usher 406*c*, nav 406*d* and V2 406*f*.

For the metro volume X1, host writes 401*b* to the metro volume received at TPG6 404*f* of DS B 410*b* are applied to V2 406*f* and also replicated to DS A 410*a* and applied to V1A 402*g*. In further detail in at least one embodiment, a host write 401*b* received at the TPG 404*f* of DS B 410*b* can be serviced by sending the host write 401*b* to the following sequence of components in connection with applying the write 401*b* to the volume V2 406*f*: usher 406*c*, nav 406*d*, and the volume V2 406*f*. The host write 401*b* received at TPG 404*f* of DS B 410*b* can be replicated to DS A 410*a* by sending the host write 401*b* to the following sequence of components: usher 406*c*, nav 406*d*, TS 406*e*, TS 402*e*, usher 402*c*, nav 402*d* and V1A 402*g*.

Figure 6B:
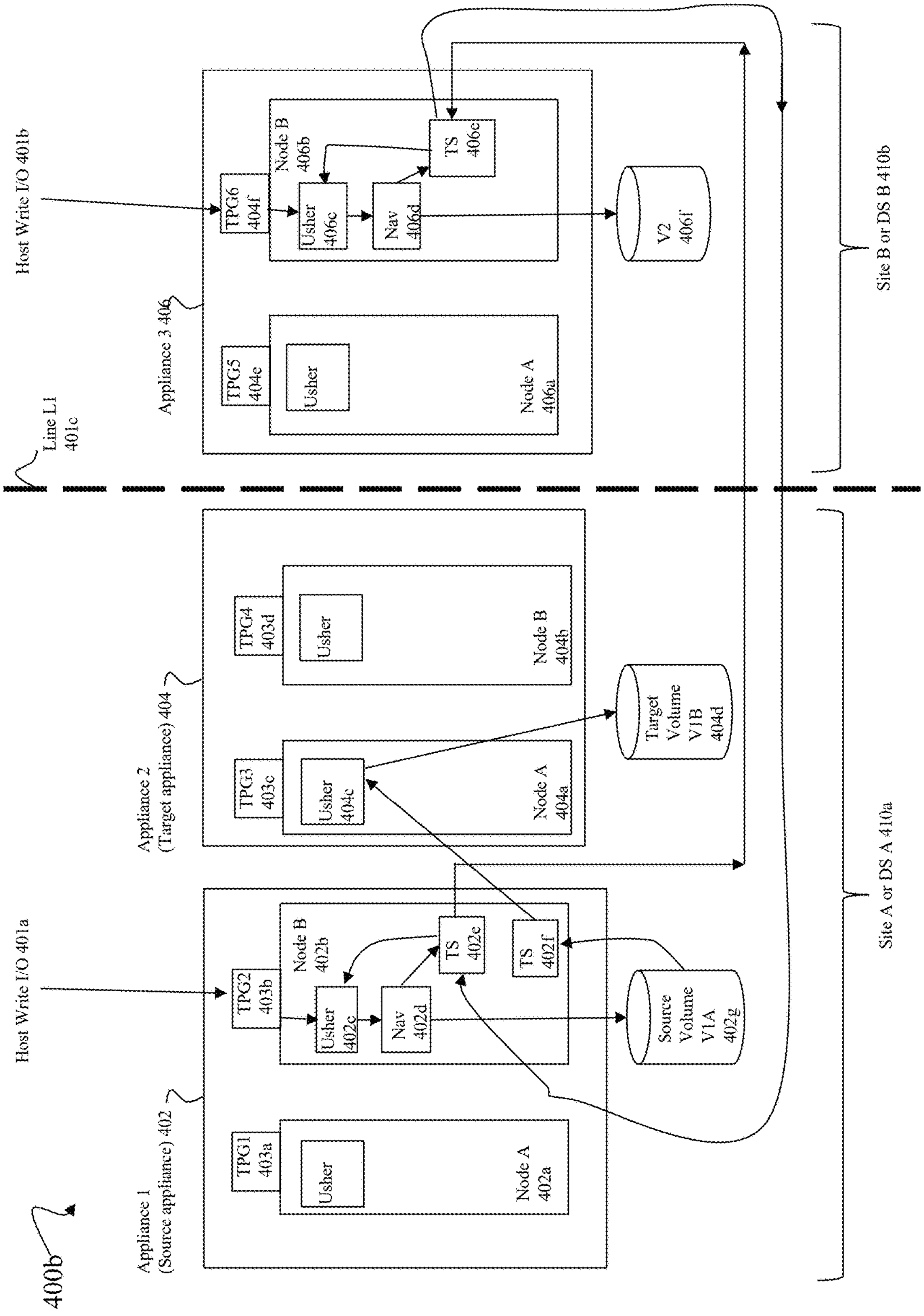

During the migration process in at least one embodiment, processing can include performing an initial synchronization or synch between the source volume V1A 402*g* and the target volume V1B 404*d*. As illustrated in the example 400*b* of FIG. 6B, the host can continue to send I/Os to the metro volume at both DS A 410*a* and DS B 410*b* in an ongoing manner while the initial synch, and thus part of the migration processing, is performed. FIG. 6B includes the same components and flow arrows denoting the bi-directional replication for the metro volume X1 as discussed above in connection with FIG. 6A. Additionally, FIG. 6B includes additional flow arrows illustrating the data processing flow in connection with the intra-cluster or intra-system migration of V1A 402*g* to V1B 404*d*. The additional migration flow illustrated by FIG. 6B includes the following sequence of components in connection with copying content of V1A 402*g* to V1B 404*d*: V1A 402*g*, TS 402*f*, usher 404*c*, and V1B 404*d*, where 404*c-d* are components of the target appliance 404, and where 402*f* is a component of the source appliance 402.

In at least one embodiment, the initial synchronization of V1A 402*g* and v1B 404*d* can include taking an initial snapshot of V1A (which includes all content currently stored on V1A) and copying the content of the initial snapshot to V1B. In the example 400*b* of FIG. 6B, an additional TS object 402*f* is used in connection with facilitating the copying or migration of content from V1A 402*g* to V1B 404*d*.

Following the initial synchronization, processing can include a second stage or phase, the migration cutover phase or stage. In at least one embodiment, the migration cutover phase or stage can include performing one or more additional incremental delta synchronizations between the source volume V1A 402*g* and the target volume V1B 404*d*. During the initial synchronization, additional host writes directed to the metro volume X1 can be received at 401*a* and/or 401*b*. Thus these additional writes also need to be copied from V1A 402*g* to V1B 404*d*. These additional writes received and written to the metro volume X1 during the initial synchronization can be copied from V1A 402 to V1B 404*d* in the one or more delta synchronizations of the second or migration cutover phase. In at least one embodiment, each delta synchronization can include copying writes, deltas or data changes made between two successive snapshots of V1A 402 to V1B. Thus each delta synchronization can include taking another snapshot N of V1A, determining the data differences between the current snapshot N of V1A and the most recent prior snapshot N−1 of V1A, and then copying the data differences of the snapshot N from V1A to V1B.

A delta synchronization can refer to a single iteration in connection with a single migration cycle or snapshot difference between successive snapshots of V1A or migration source volume 402*g*. After the initial synchronization in at least one embodiment, subsequent snapshots can be taken of V1A where such snapshots are used in connection performing the snapshot difference technique to determine V1A data changes or differences between two successive snapshots. Thus with each delta synchronization, a new snapshot can be taken of V1A and the content of the new snapshot migrated to V1B.

In at least one embodiment, processing can include performing an initial synchronization between the source and target volumes, V1A and V1B, where the initial synchronization can be performed using a data storage system internal snapshot taken at the start or create time of the migration session. Subsequently in the second or migration cutover phase, processing can include performing snapshot based delta synchronizations with respect to V1A and V1B until the volume data differences with respect to the source volume V1A are below a specified threshold level (e.g., such that the source volume and respective target volume have minimal data differences below the threshold level). In this manner, delta synchronizations can be performed until the amount of data copied or size of data copied in a most recent delta synchronization is below the specified threshold. In at least one embodiment, any remaining writes to V1A of a last delta synchronization can be subsequently copied to V1 at a later point in time after pausing the metro volume discussed below.

In at least one embodiment, the writes or content of the delta synchronizations can be sent from V1A to V1B using the data flow through the sequence of components as noted above for the initial synchronization: V1A 402*g*, TS 402*f*, usher 404*c*, and V1b 404*d*.

Once the size or amount of data of the most recent delta synchronization is below the specified threshold, the migration cutover phase can further include pausing the metro volume and its associated bi-directional replication. In at least one embodiment, pausing the metro volume and thus its associated bi-directional replication can include disabling or fracturing the metro volume and its associated bi-directional replication. After the pausing, processing can include disabling host access to the metro volume X1 on paths to the migration system or site DS A 410*a* such as, for example, by setting the state of paths to the DS A 410*a* over which the metro volume X1 is exposed to unavailable whereby the such paths to DS A 410*a* are unavailable for issuing I/Os to the metro volume X1. The metro volume X1 is however still accessible to hosts over paths from DS B 410*b*, such as paths to TPGs 404*e-f*. In this example, the metro volume X1 can be available over i) first paths to TPG 404*f* which are AO or preferred paths, and ii) second paths to TPG 404*e* which are ANO or non-preferred paths. In this manner, all host I/Os can now be directed to only the non-migration system or site, DS B 410*b*. In particular, host I/Os can be sent over the AO paths to TPG 404*f* of DS B 410*b*.

Figure 6C:
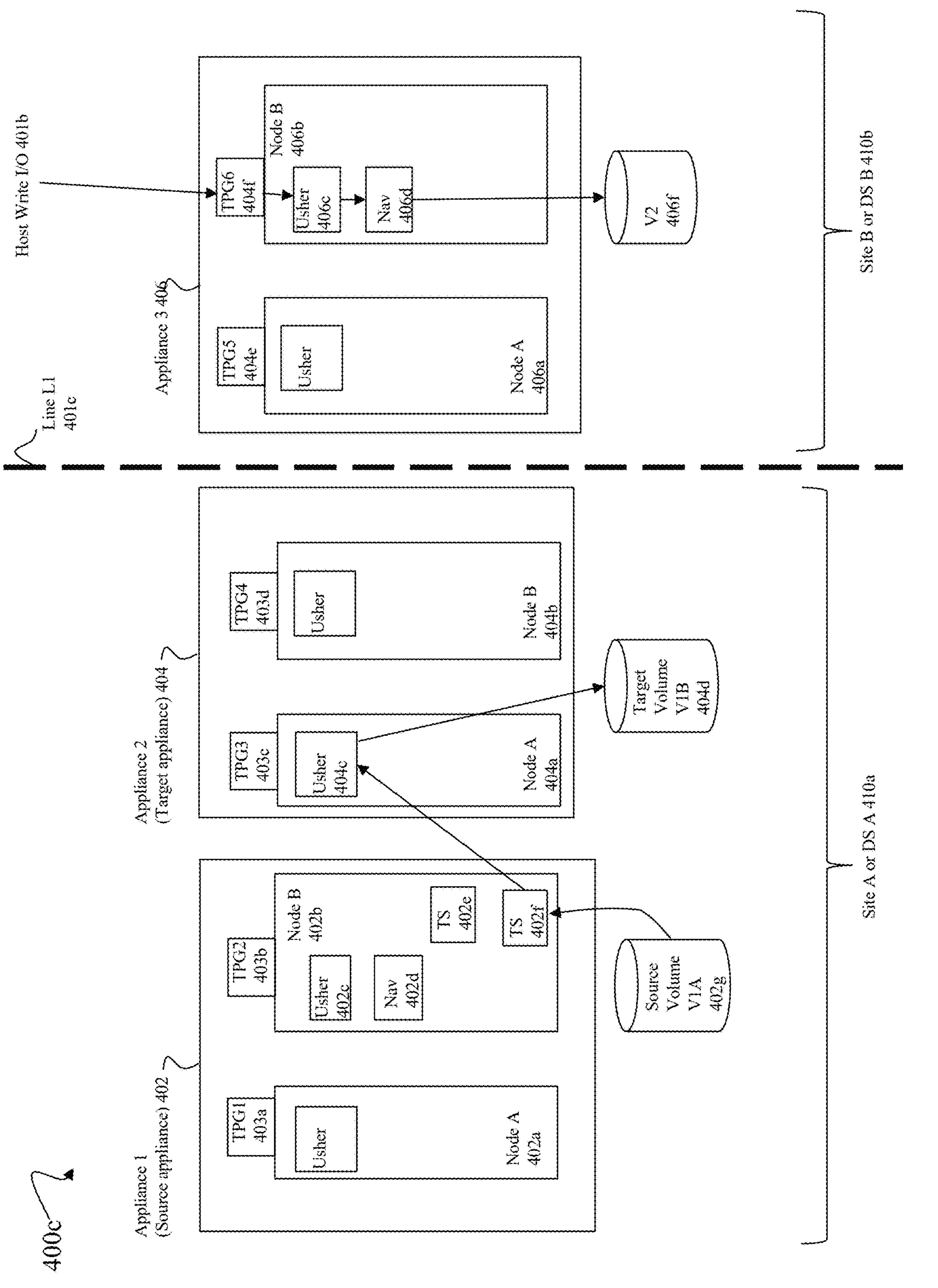

Referring to FIG. 6C, shown is an example 400*c* illustrating the state of the systems and data flows that can be active when the metro volume and its associated replication are paused and the source site or system DS A 410 is detached from external clients or hosts in connection with the cutover phase in at least one embodiment in accordance with the techniques of the present disclosure.

FIG. 6C is similar to FIG. 6B with the following differences: i) the data flow and processing of host I/Os which are directed to the metro volume X1 and received at DS A 410*a* are removed and not performed; and ii) the data flow and processing associated with replicating metro volume X1 writes between the systems 410*a-b* are removed and not performed. Thus, as illustrated in FIG. 6C, the host write UOs 401*b* are still received at TPG 404*f* and processed by the non-migration site, DS B 410*b*, as denoted by the following sequence: host write I/O 401*b*, TPG 404*f* usher 406*c*, nav 406*d*, and V2 406*f*.

In at least one embodiment, after pausing the metro volume X1 and its associated replication, processing can detach the host from the migration site or system DS A 410*a*. In this example of FIG. 6C, the foregoing detaching can be performed by setting the paths to the appliances 402 and 404 of DS A 410*a* to unavailable with respect to the metro volume X1 whereby the metro volume X1 is not exposed or available over paths to DS A 410*a* for servicing I/O directed to the metro volume.

In at least one embodiment after detaching the host from the migrate site or system DS 410*a*, the last remaining delta synchronization can be performed to copy over the last remaining set of data differences from V1A 402*g* to V1B 404*d* (e.g., from V1A 402*g*, TS 402*f*, usher 404*c* and V1B 404*d*). In at least one embodiment, the last delta synchronization M can include writes to the metro volume X1 which are received at the source appliance 404 of DS A 410*a* i) while copying changes of the most recent prior delta synchronization M−1, and ii) prior to detaching or removing host access to the metro volume X1 through the migration site DS 1 410*a* (e.g., prior to detaching or removing host access to the metro volume X1 through the source appliance 404 of DS1 410*a*). Generally, the last delta synchronization M can include writes that need to be applied to V1B 404*d* to bring V1B up to date to the point in time when the metro volume X1 was paused or fractured during the migration. Thus after applying the last delta synchronization M to V1B 404*d*, both V1A and V1B contain the same content corresponding to the point in time PT1 when the metro volume X1 is fractured by pausing during the migration. It should be noted that V2 406*f* has all the writes applied up to the point in time PT1 as prior to the fracture since such writes have been replicated from DS A 410 to DS B 410*b* and then applied to V2 406*f* in connection with the metro volume X1 replication in effect prior to the pausing. In at least one embodiment, copying and applying the last delta synchronization M to V1B can be performed as part of switching or cutting over from V1A to V1B in connection with the metro volume X1 configuration.

In at least one embodiment, after pausing the metro volume X1 and copying and applying the last delta synchronization M to V1B 404*d*, the source volume V1A 402*g* can be deleted or removed, and then the metro volume X1 and associated replication can be resumed. In at least one embodiment, resuming or enabling the metro volume X1 and associated replication after the pause and intentional fracture of the metro volume X1 during the migration can include synchronizing the two volumes V1B and V2 of the configured metro volume X1.

Consistent with discussion above after applying the last delta synchronization M, V1B has the same identical content as V2 before the pause and metro volume X1 fracture. After the metro volume X1 fracture, there can be additional metro volume X1 writes applied to V2 whereby V2 now is the most up to date copy of the metro volume X1. Thus V2 (of the preferred non-migrating site) denotes the most up to date copy of the metro volume X1 and can include accumulated additional writes or content received while the metro volume X1 was paused and thus fractured. Processing to resume the metro volume X1 and associated replication can include synchronizing V1B 404*d* with V2 406*f* (of the preferred non-migrating site) so that the additional writes of V2 from the non-migrating site (with the preferred role) can be copied and applied to V1B 404*d* (of the migrating site with the non-preferred role). After V1B and V2 are synchronized and the metro volume X1 and associated replication are resumed such that the metro volume X1 is ready to be accessed by clients, processing can include enabling host access to the metro volume X1 on paths to the migration system or site DS A 410*a*. In particular at this point in the migration process, host access or attachment to the metro volume X1 can be enabled on paths to the target appliance 404 such as with paths to the TPG4 403*d* set to preferred or AO and paths to TPG3 403*c* set to non-preferred or ANO.

Figure 6D:
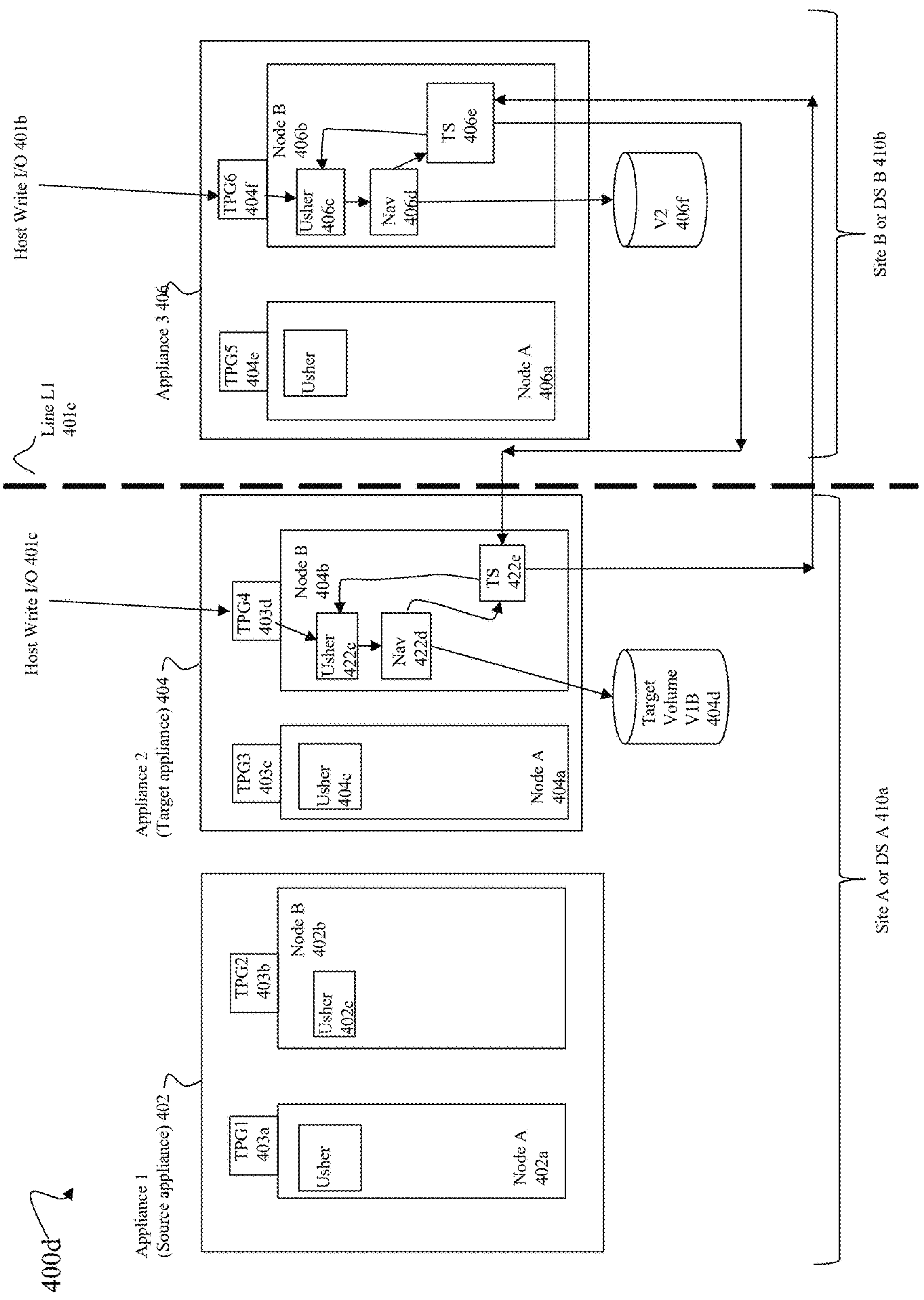

Referring to FIG. 6D, shown is an example 400*d* illustrating the state of the systems after migration is completed in at least one embodiment in accordance with the techniques of the present disclosure.

FIG. 6D includes components similarly numbered as noted above in connection with other FIGS. 6A-6C with data flow processing for host write UOs described below. After completing the migration from V1A to V1B as illustrated in FIG. 6D, the metro volume X1 can be configured from the volume pair (V1B 404*d*, V2 406*f*) consistent with discussion above. In this case with the configured bi-directional replication for the metro volume X1, i) writes to the metro volume received at DS A 410*a* are applied to V1B 404*d*, and also replicated to DS B 410*b* and applied to V2 406*f*; and ii) writes to the metro volume received at DS B 410*b* are applied to V2 406*f* and also replicated to DS A 410A and applied to V1B 404*d*. The metro volume X1 can be exposed to external hosts over 4 TPGs 403*c-d* (of the target appliance 404) and 404*e-f*. After the migration, the metro volume X1 is not exposed over TPGs 403*a-b*.

In at least one embodiment, the metro volume X1 can be exposed over paths from TPGs 403*c-d*, 404*e-f*, where paths to TPGs 403*c* and 404*e* over which the metro volume X1 is exposed can be set to the ALUA path state of ANO (active non-optimized or non-preferred), and where paths to TPGs 403*d* and 404*f* over which the metro volume X1 is exposed can be set to the ALUA path state of AO (active optimized or preferred). Based on the foregoing path states in normal operation, host I/Os directed to the metro volume X1 can be sent over the preferred or active optimized paths to the target ports of the TPGs 403*d* and 404*f*.

For the metro volume X1, host writes 401*c* to the metro volume received at TPG 403*d* of DS A 410*a* are applied to V1B 404, and also replicated to DS B 410*b* and applied to V2 406*f*. In further detail in at least one embodiment, a host write 401*c* received at the TPG 403*d* of DS A 410*a* can be serviced by sending the host write 401*a* to the following sequence of components in connection with applying the write 401*c* to the V1B 404*d*: usher 422*c*, nav 422*d*, and the volume V1B 404*d*. The host write 401*c* received at TPG 403*d* of DS A 410*a* can be replicated to DS B 410*b* by sending the host write 401*c* to the following sequence of components: usher 422*c*, nav 422*d*, TS 422*e*, TS 406*e*, usher 406*c*, nav 406*d* and V2 406*f*.

For the metro volume X1, host writes 401*b* to the metro volume received at TPG6 404*f* of DS B 410*b* are applied to V2 and also replicated to DS A 410*a* and applied to V1B. In further detail in at least one embodiment, a host write 401*b* received at the TPG 404*f* of DS B 410*b* can be serviced by sending the host write 401*b* to the following sequence of components in connection with applying the write 401*b* to the volume V2 406*f*: usher 406*c*, nav 406*d*, and the volume V2 406*f*. The host write 401*b* received at TPG 404*f* of DS B 410*b* can be replicated to DS A 410*a* by sending the host write 401*b* to the following sequence of components: usher 406*c*, nav 406*d*, TS 406*e*, TS 422*e*, usher 422*c*, nay 422*d* and V1 B 404*d*. It should be noted that the components 422*c-e* are in the target appliance 404.

Figure 7A:
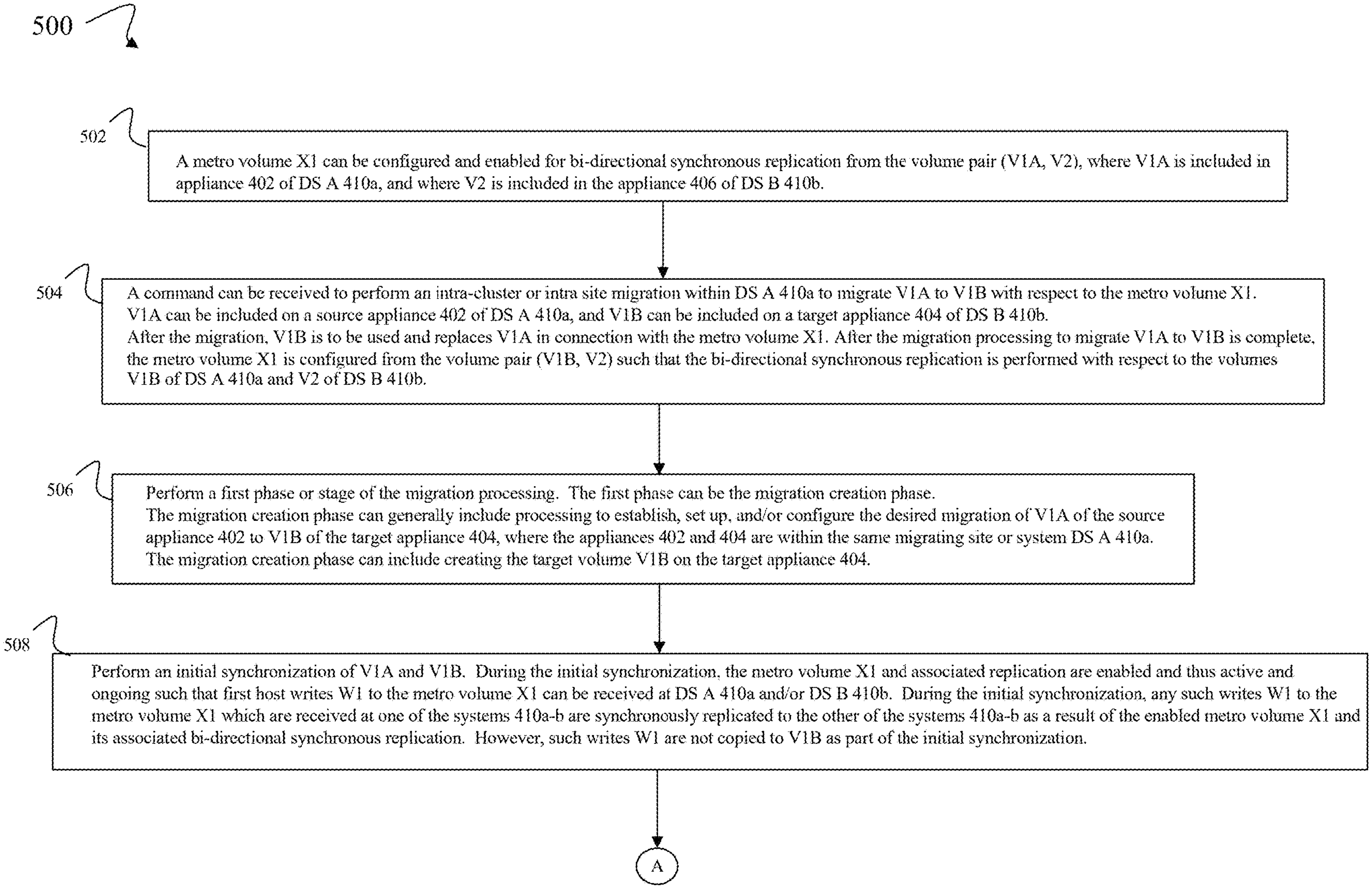

Referring to FIGS. 7A-7C, shown is a flowchart, 500, 501, 502 of processing steps that can be performed in at least one embodiment in accordance with the techniques of the present disclosure. The steps of FIGS. 7A-C summarize processing described above.

At the step 502, a metro volume X1 can be configured and enabled for bi-directional synchronous replication from the volume pair (V1A, V2), where V1A is included in appliance 402 of DS A 410*a*, and where V2 is included in the appliance 406 of DS B 410*b*. From the step 502, control proceeds to the step 504. For example, FIG. 6A can illustrate the state of the systems 401*a-b* and the metro volume X1 configured and enabled for bi-directional synchronous replication after completing step 502.

At the step 504, a command can be received, such as from a customer or user of the systems 410*a-b*, to perform an intra-cluster or intra site migration within DS A 410*a* to migrate V1A to V1B with respect to the metro volume X1. V1A can be included on a source appliance 402 of DS A 410*a*, and V1B can be included on a target appliance 404 of DS B 410*b*. After the migration, V1B is to be used and replaces V1A in connection with the metro volume X1. After the migration processing to migrate V1A to VB is complete, the metro volume X1 is configured from the volume pair (V1B, V2) such that the bi-directional synchronous replication is performed with respect to the volumes V1B of DS A 410*a* and V2 of DS B 410*b*. From the step 504, control proceeds to the step 506 to commence migration processing to migrate V1A to V1B in at least one embodiment in accordance with the techniques of the present disclosure.

At the step 506, a first phase or stage of the migration processing can be performed. The first phase can be the migration creation phase. The migration creation phase can generally include processing to establish, set up, and/or configure the desired migration of V1A of the source appliance 402 to V1B of the target appliance 404, where the appliances 402 and 404 are within the same migrating site or system DS A 410*a*. The migration creation phase can include creating the target volume V1B on the target appliance 404. From the step 506, control proceeds to the step 508.

At the step 508, processing can include performing an initial synchronization of V1A and V1B. During the initial synchronization, the metro volume X1 and associated replication are enabled and thus active and ongoing such that first host writes W1 to the metro volume X1 can be received at DS A 410*a* and/or DS B 410*b*. During the initial synchronization, any such writes W1 to the metro volume X1 which are received at one of the systems 410*a-b* are synchronously replicated to the other of the systems 410*a-b* as a result of the enabled metro volume X1 and its associated bi-directional synchronous replication. However, such writes W1 are not copied to V1B as part of the initial synchronization. The writes W1 can be copied in connection with performing delta synchronization processing in a subsequent second phase or stage or migration processing. For example, FIG. 6B can illustrate the state of the systems 401*a-b* during the initial synchronization of the step 508. From the step 508, control proceeds to the step 510*a*.

At the step 510*a*, a second phase or stage of the migration processing can commence. The second phase can be the migration cutover phase. The migration cutover phase can include performing the steps of 510*a* and 510*b*.

A step S1 can be performed. S1 processing can include internally setting or assigning the preferred role to the non-migration site, DS B 410*b*, and assigning the non-preferred role to the migration site DS A 410*a*. S1 processing can include saving the current role assignments, as prior to the internal role assignment, to a particular location before internally setting or assigning the roles of preferred and non-preferred, respectively, to the non-migration site and migration site. Consistent with other discussion herein in at least one embodiment, the internal preferred and non-preferred role assignments, respectively, to the non-migration site and the migration site are used to ensure that the subsequent purposeful fracturing of the metro volume X1 during the migration processing results in only the non-migration site remaining online to service metro volume X1 I/Os. As also discussed elsewhere herein in at least one embodiment, prior to performing the migration processing the migration and non-migration sites involved in the metro volume X1 configuration can each be assigned a particular one of the roles, for example, based on default role assignments or user specified role assignments. The step S1 can include saving such role assignments prior to performing the internal role assignments of the step S1.

After the step S1, a step S2 can be performed. S2 processing can include performing one or more delta synchronizations to migrate content of V1A to V1B. Each delta synchronization can denote a single replication cycle of content or data migrated from V1A to V1B. At each delta synchronization N, a corresponding snapshot N of V1A can be taken such that the content of delta synchronization N includes all the content of snapshot N of V1A. The content of delta synchronization N, as denoted by the snapshot N of V1A, can be determined based on data changes or writes to V1A since the most recent prior delta synchronization N−1 and corresponding snapshot N−1 of V1A. Thus the content of delta synchronization N can denote writes to V1A since taking the snapshot N−1 of V1A for delta synchronization N−1. In at least one embodiment the content of delta synchronization N can be determined using the snapshot difference technique that determines the data changes or differences between the two successive snapshots N and N−1 of V1A, where snapshot N−1 corresponds to the V1A snapshot taken for delta synchronization N−1, and snapshot N corresponds to the V1A snapshot taken for delta synchronization N. In at least one embodiment, delta synchronizations of S2 can be performed until the size or amount of data (e.g., changed content or writes) of the delta synchronization is below a specified threshold size.

After the most recent delta synchronization has a corresponding size below the specified threshold and the delta synchronization (and thus S2) has stopped, a step S3 can be performed. The step S3 can include pausing the metro volume X1. Pausing the metro volume X1 can include disabling or fracturing the metro volume X1 thereby pausing the metro volume X1's bi-directional synchronous replication. As a result of purposely triggering the fracturing of the metro volume X1, a polarization policy, rule or condition can be triggered which specifies one or more actions to take in response to the fracture. The polarization policy, rule or condition can specify that, in response to fracturing the metro volume X1, the site or system assigned the preferred role (e.g., the non-migration site DS B in this example) is the sole site that continues to service I/O directed to the metro volume X1 while fractured, and the metro volume X1 is thus unavailable and/or inaccessible to hosts through the site assigned the non-preferred role (e.g., the migration site DS A in this example) while the metro volume X1 is fractured.

In this case, implementing or enforcing the polarization policy can include performing the step S4. S4 can include processing to detach or remove host access to the metro volume X1 through the non-preferred migration site DS A. In this example, processing of S4 can include detaching or removing host access to the source appliance 402 of DS A 410*a* such as by making the metro volume X1 unavailable over paths from the source appliance 402 of DS A 410*a*. In at least one embodiment, the paths P1 to the source appliance 402 with respect to the metro volume X1 can be set to a corresponding state denoting that the metro volume X1 is unavailable over the paths P1 to the source appliance 402. For example, the paths to the source appliance 402 can be set to an ALUA path state of unavailable. S4 can include saving host mapping information for the metro volume X1. The host mapping information can identify the particular one or more hosts, and ports thereof that are allowed to access the metro volume X1. Thus responsive to the fracturing of the metro volume X1, the polarization policy can cause processing to be performed such as noted above and described herein so that i) the fractured metro volume X1 can only and solely be accessed (e.g., such as for I/Os) over paths from the particular site or system, such as DS B 410*b*, assigned the preferred role, and ii) the fractured metro volume X1 is unavailable (e.g., cannot be accessed for I/Os) over paths from the particular site or system, such as DS A 410*a*, assigned the non-preferred role.

For example, FIG. 6C can illustrate the state of the systems 401*a-b* after pausing the metro volume X1 and associated replication, and after detaching host access to the metro volume X1 through the non-preferred migration site DS A 410*a*.

From the step 510*a*, processing of the migration cutover phase can continue with the step 510*b*. The step 510*b* can continue with additional processing of the migration cutover phase in at least one embodiment.

At the step 510*b*, after performing S4 such that host access to the metro volume X1 through the source appliance 402 is removed or detached, a step S5 can be performed. S5 processing can include i) determining the final delta synchronization M for V1A and copy the content or data changes thereof from the source appliance 402 to the target appliance 404, and ii) applying the data changes of the final delta synchronization M to V1B. Generally, such processing of S5 can be performed to determine a last or final set of data changes that need to be applied to V1B to ensure that the content of V1B is synchronized with V1A whereby V1B is identical in terms of content to V1A. The final delta synchronization can also be determined using the snapshot difference technique.

After the step S5, the source volume V1A has been fully migrated to the target volume V1B. V1A denotes a point in time copy of the metro volume X1 when the metro volume X1 was fractured by the pausing of the step S3 whereby the corresponding bi-directional synchronization replication is disabled or stopped. After completing the step S5, both V1A and V1B correspond to that same point in time copy or version of content of the metro volume X1 when fractured occurred in connection with the pausing of step S3.

After performing S5, a step S6 can be performed. S6 processing can include deleting or removing the migration replication previously established in step 506 (the migration creation phase). S6 can include removing or deleting the source volume V1A.

After S6, a step S7 can be performed. The step S7 can include resuming, and thus re-enabling and reestablishing, the metro volume X1 and its corresponding bi-directional synchronous replication. The step S7 can include updating the metro volume pair for the metro volume X1 to utilize V1B rather than V1A such that the metro volume X1 is now configured and enabled for the volume pair (V1B, V2) where V1B is included in the target appliance 404 of DS A 410*a* and V2 is included in the appliance 406 of DS B 410*b*. S7 can include performing processing to synchronize V1B with V2. V2 is the most up to date copy of the metro volume X1 since V2 was used in connection with servicing metro volume X1 I/Os while metro volume X1 was fractured. In at least one embodiment, the appliance 406 can i) track the writes or data changes W2 made to V2 since the fracturing of the metro volume X1 in connection with the step S3; ii) copy the data changes or writes W2 from the appliance 406 to the target appliance 404; and iii) apply the data changes or writes W2 to the target volume V1B. The step S7 can include waiting for the metro volume X1 to be ready to be accessed by clients such as external hosts. In at least one embodiment, the metro volume X1 can be ready once V1B and V2 are synchronized in terms of content (e.g., after the data changes or writes W2 are applied to V1B).

After the step S7, the metro volume X1 is ready to be accessed by clients such as external hosts. Following the step S7, a step S8 can be performed. S8 processing can include attaching host access to the metro volume X1 at the target appliance such that the metro volume X1 is accessible through paths from the target appliance 404 of DS A 410*a*. In at least one embodiment in accordance with the ALUA standard, S8 can include i) setting states of the paths to TPG 403*d* of the target appliance 404 (as in FIG. 6D) to AO, and ii) setting states of paths to TPG 403*c* of the target appliance 404 (as in FIG. 6D) to ANO. S8 can include using the previously saved host mapping information (e.g., saved in step S4) for the metro volume X1 to allow the identified hosts, and ports thereof, to access the metro volume X1 now through the target appliance 404 and its target ports rather than through the source appliance 402 and its ports.

After S8, a step S9 can be performed. S9 processing can include restoring the roles of the sites or systems 410*a-b* as prior to the migration processing commenced at step 506. In at least one embodiment as discussed above, the step S1 of the migration cutover phase can include saving the current role assignments, as prior to internally assigning or updating, to a specified location. The step S9 can include now internally restoring the roles of preferred and non-preferred among the sites or systems 410*a-b* from the specified location.

For example, FIG. 6D can illustrate the state of the systems 401*a-b* after completing the migration processing and thus after completing the step 510*b*.

Once processing of the migration cutover phase is complete such as after performing the steps of 510*a-b*, control can proceed to the step 512. More generally, after completing the migration processing (e.g., steps 510*a-b*), control can proceed to the step 512. In the step 512, an alert or message can be sent to each of the one or more hosts identified in the host mapping information to perform discovery processing to rescan and discover the paths to the metro volume X1. In particular, the paths discovered include the new paths to the TPGs 403*c-d* of the target appliance 404 over which the metro volume X1 is available. In at least one embodiment, one of the sites or system 410*a-b* can send the alert or message to each of the one or more hosts. In at least one embodiment, the migration site or system DS A 410*a* can send the alert or message to each of the one or more hosts.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A computer-implemented method comprising:

configuring a metro volume for bi-directional synchronous replication from a volume pair (V1A, V2), where V1A is included in a first site and V2 is included in a second site, wherein V1A and V2 are configured to have a same identity, a first identity of a first logical device, when presented to external clients over i) first paths from the first site and ii) second paths from the second site; and performing migration processing to migrate V1A to another volume V1B of the first site, wherein the first site is a migration site and wherein the second site is a non-migration site, said migration processing including:

internally assigning i) the migration site a non-preferred role in which the migration site is not to remain online when the metro volume is fractured, and ii) the non-migration site a preferred role in which the migration site is to remain online when the metro volume is fractured;

pausing the metro volume including fracturing the metro volume thereby disabling the bi-directional synchronous replication with respect to the volume pair (V1A, V2), wherein V1A denotes a first point in time copy of the metro volume when the metro volume is fractured by said pausing;

in response to said fracturing the metro volume, removing access to the metro volume through the migration site having the non-preferred role whereby all I/Os directed to the metro volume from the external clients are directed to the non-migration site having the preferred role;

receiving, at the non-migration site while the metro volume is fractured, first writes directed to the metro volume where the first writes are applied to V2 configured as the metro volume;

after V1A and V1B are synchronized to the first point in time copy of the metro volume, enabling the metro volume for bi-directional synchronous replication from a second volume pair (V1B, V2), wherein V1B and V2 are configured to have the same identity, the first identity of the first logical device, when presented to external clients over i) third paths from the first site and ii) the second paths from the second site, wherein said enabling includes:

synchronizing V1B and V2, including applying the first writes to V1B, where prior to said synchronizing, the first writes had been applied to V2 and the first writes had not been applied to V1B; and in response to said enabling the metro volume for bi-directional synchronous replication from the second volume pair (V1B, V2), providing access to the metro volume configured as the second volume pair to the external clients from both the migration site and the non-migration site.

2. The computer-implemented method of claim 1, wherein V1A is included in a source appliance of the migration site, V1B is included in a target appliance of the migration site, and wherein the source appliance is different from the target appliance.

3. The computer-implemented method of claim 2, wherein V1A, configured as the first logical device with the first identity, is accessible to the external clients over the first paths from the source appliance of the migration site prior to said migration processing and prior to said fracturing the metro volume.

4. The computer-implemented method of claim 2, wherein V1B, configured as the first logical device with the first identity, is not accessible to the external clients prior to said migration processing.

5. The computer-implemented method of claim 2, wherein V1B, configured as the first logical device with the first identity, is not accessible to the external clients prior to said enabling.

6. The computer-implemented method of claim 2, wherein V2, configured as the first logical device with the first identity, is accessible to the external clients over the second paths of the non-migration site while performing said method, and wherein V1B, configured as the first logical device with the first identity, is accessible to the external clients over the third paths of the target appliance of the migration site after said providing access to the metro volume when configured from the second volume pair (V1B, V2).

7. The computer-implemented method of claim 1, wherein a polarization policy specifies that, if the metro volume is fractured thereby disabling the bi-directional synchronous replication with respect to the volume pair (V1A, V2), a selected one of the migration site and the non-migration site currently assigned the preferred role remains online as a sole site available to service I/Os directed to the metro volume while the metro volume is fractured.

8. The computer-implemented method of claim 7, wherein the polarization policy specifies that, if the metro volume is fractured thereby disabling the bi-directional synchronous replication with respect to the volume pair (V1A, V2), the metro volume is unavailable from a selected one of the migration site and the non-migration site currently assigned the non-preferred role while the metro volume is fractured.

9. The computer-implemented method of claim 1, wherein prior to said pausing, the method includes:

copying a first portion of data of V1A to V1B.

10. The computer-implemented method of claim 9, wherein prior to said pausing and after said copying the first portion, the method further includes:

performing one or more delta synchronizations each copying a different data portion of V1A to V1B.

11. The computer-implemented method of claim 10, further comprising:

receiving, at the migration site while performing said copying of the first portion of data of V1A to V1B, second writes directed to the metro volume, wherein a first of the one or more delta synchronizations includes copying the second writes from V1A to V1B.

12. The computer-implemented method of claim 1, wherein said configuring the metro volume includes enabling bi-directional synchronous replication for the metro volume configured from the volume pair (V1A, V2).

13. The computer-implemented method of claim 12, wherein, when said bi-directional synchronous replication is enabled for the metro volume configured from the volume pair (V1A, V2), the method includes performing said bi-directional synchronous replication for the metro volume configured from the volume pair (V1A, V2).

14. The computer-implemented method of claim 13, wherein said performing said bi-directional synchronous replication for the metro volume configured from the volume pair (V1A, V2) further includes:

receiving, at the first site, third writes directed to the metro volume;

applying the third writes to V1A;

replicating the third writes from the first site to the second site; and applying the third writes, as replicated from the first site, to V2 of the second site.

15. The computer-implemented method of claim 14, wherein said performing said bi-directional synchronous replication for the metro volume configured from the volume pair (V1A, V2) further includes:

receiving, at the second site, fourth writes directed to the metro volume;

applying the fourth writes to V2;

replicating the fourth writes from the second site to the first site; and applying the fourth writes, as replicated from the second site, to V1A of the first site.

16. The computer-implemented method of claim 1, further comprising:

after V1A and V1B are synchronized, removing V1A.

17. The computer-implemented method of claim 1, wherein prior to said internally assigning, the migration site is assigned the preferred role and the non-migration site is assigned the non-preferred role, and wherein the method includes:

prior to said internally assigning, saving first information denoting a first role assignment where the migration site is assigned the preferred role and the non-migration site is assigned the non-preferred role; and after said providing access to the metro volume through the migration site whereby the metro volume is accessible to the external clients from the migration site and the non-migration site, internally restoring role assignments, including reassigning the preferred role and the non-preferred role, respectively, to the migration site and the non-migration site based, at least in part, on the first information.

18. A system comprising:

one or more processors; and one or more memories comprising code stored therein that, when executed, performs a method comprising:

configuring a metro volume for bi-directional synchronous replication from a volume pair (V1A, V2), where V1A is included in a first site and V2 is included in a second site, wherein V1A and V2 are configured to have a same identity, a first identity of a first logical device, when presented to external clients over i) first paths from the first site and ii) second paths from the second site; and performing migration processing to migrate V1A to another volume V1B of the first site, wherein the first site is a migration site and wherein the second site is a non-migration site, said migration processing including:

internally assigning i) the migration site a non-preferred role in which the migration site is not to remain online when the metro volume is fractured, and ii) the non-migration site a preferred role in which the migration site is to remain online when the metro volume is fractured;

pausing the metro volume including fracturing the metro volume thereby disabling the bi-directional synchronous replication with respect to the volume pair (V1A, V2), wherein V1A denotes a first point in time copy of the metro volume when the metro volume is fractured by said pausing;

in response to said fracturing the metro volume, removing access to the metro volume through the migration site having the non-preferred role whereby all I/Os directed to the metro volume from the external clients are directed to the non-migration site having the preferred role;

receiving, at the non-migration site while the metro volume is fractured, first writes directed to the metro volume where the first writes are applied to V2 configured as the metro volume;

after V1A and V1B are synchronized to the first point in time copy of the metro volume, enabling the metro volume for bi-directional synchronous replication from a second volume pair (V1B, V2), wherein V1B and V2 are configured to have the same identity, the first identity of the first logical device, when presented to external clients over i) third paths from the first site and ii) the second paths from the second site, wherein said enabling includes:

synchronizing V1B and V2, including applying the first writes to V1B, where prior to said synchronizing, the first writes had been applied to V2 and the first writes had not been applied to V1B; and in response to said enabling the metro volume for bi-directional synchronous replication from the second volume pair (V1B, V2), providing access to the metro volume configured as the second volume pair to the external clients from both the migration site and the non-migration site.

19. One or more non-transitory computer-readable media comprising code stored thereon that, when executed, performs a method comprising:

configuring a metro volume for bi-directional synchronous replication from a volume pair (V1A, V2), where V1A is included in a first site and V2 is included in a second site, wherein V1A and V2 are configured to have a same identity, a first identity of a first logical device, when presented to external clients over i) first paths from the first site and ii) second paths from the second site; and performing migration processing to migrate V1A to another volume V1B of the first site, wherein the first site is a migration site and wherein the second site is a non-migration site, said migration processing including:

internally assigning i) the migration site a non-preferred role in which the migration site is not to remain online when the metro volume is fractured, and ii) the non-migration site a preferred role in which the migration site is to remain online when the metro volume is fractured;

pausing the metro volume including fracturing the metro volume thereby disabling the bi-directional synchronous replication with respect to the volume pair (V1A, V2), wherein V1A denotes a first point in time copy of the metro volume when the metro volume is fractured by said pausing;

in response to said fracturing the metro volume, removing access to the metro volume through the migration site having the non-preferred role whereby all I/Os directed to the metro volume from the external clients are directed to the non-migration site having the preferred role;

receiving, at the non-migration site while the metro volume is fractured, first writes directed to the metro volume where the first writes are applied to V2 configured as the metro volume;

after V1A and V1B are synchronized to the first point in time copy of the metro volume, enabling the metro volume for bi-directional synchronous replication from a second volume pair (V1B, V2), wherein V1B and V2 are configured to have the same identity, the first identity of the first logical device, when presented to external clients over i) third paths from the first site and ii) the second paths from the second site, wherein said enabling includes:

synchronizing V1B and V2, including applying the first writes to V1B, where prior to said synchronizing, the first writes had been applied to V2 and the first writes had not been applied to V1B; and in response to said enabling the metro volume for bi-directional synchronous replication from the second volume pair (V1B, V2), providing access to the metro volume configured as the second volume pair to the external clients from both the migration site and the non-migration site.

20. The non-transitory computer-readable media of claim 19, wherein V1A is included in a source appliance of the migration site, V1B is included in a target appliance of the migration site, and wherein the source appliance is different from the target appliance.

* * * * *